(12) United States Patent
Bian et al.

(10) Patent No.: US 12,372,717 B2
(45) Date of Patent: Jul. 29, 2025

(54) STRUCTURE INCLUDING HYBRID PLASMONIC WAVEGUIDE USING METAL SILICIDE LAYER

(71) Applicant: GlobalFoundries U.S. Inc., Malta, NY (US)

(72) Inventors: Yusheng Bian, Ballston Lake, NY (US); Ryan William Sporer, Mechanicville, NY (US)

(73) Assignee: GlobalFoundries U.S. Inc., Malta, NY (US)

( * ) Notice: Subject to any disclaimer, the term of this patent is extended or adjusted under 35 U.S.C. 154(b) by 350 days.

(21) Appl. No.: 17/936,939

(22) Filed: Sep. 30, 2022

(65) Prior Publication Data

US 2024/0111088 A1 Apr. 4, 2024

(51) Int. Cl.
*G02B 6/12* (2006.01)
*G02B 6/13* (2006.01)

(52) U.S. Cl.
CPC ........... *G02B 6/12004* (2013.01); *G02B 6/13* (2013.01); *G02B 2006/12061* (2013.01)

(58) Field of Classification Search
CPC ....................................................... G02B 6/13
See application file for complete search history.

(56) References Cited

U.S. PATENT DOCUMENTS

| | | |
|---|---|---|
| 8,994,946 B2 | 3/2015 | McCaffrey et al. |
| 10,649,245 B1 | 5/2020 | Bian et al. |
| 10,684,530 B1 | 6/2020 | Bian et al. |
| 10,871,614 B1 | 12/2020 | Bian et al. |
| 11,067,751 B2 | 7/2021 | Meagher et al. |
| 2002/0079427 A1* | 6/2002 | Xu ...................... H01L 31/1085 257/E31.066 |
| 2005/0123232 A1* | 6/2005 | Piede ..................... G02B 6/125 385/27 |
| 2012/0280345 A1* | 11/2012 | Zhu ....................... G02B 6/1226 257/E31.127 |
| 2022/0128762 A1 | 4/2022 | Bian et al. |
| 2022/0196909 A1 | 6/2022 | Holt et al. |

FOREIGN PATENT DOCUMENTS

| | | | | |
|---|---|---|---|---|
| DE | 0378112 A2 * | 1/1990 | ............... | G02B 6/42 |
| WO | WO-2022067268 A2 * | 3/2022 | ............ | G01J 1/0214 |

OTHER PUBLICATIONS

Translation of EP-0378112-A2 (Year: 1990).*

(Continued)

*Primary Examiner* — Chad H Smith
(74) *Attorney, Agent, or Firm* — Francois Pagette; Hoffman Warnick LLC

(57) ABSTRACT

A structure or PIC structure includes a hybrid plasmonic (HP) waveguide. The HP waveguide includes a waveguide core, and a metal silicide layer contacting the waveguide core. The metal silicide layer replaces noble metals typically provided in hybrid plasmonic waveguides, providing improved optical signal containment characteristics. The metal silicide layer is also compatible with CMOS fabrication techniques, and capable of additional scaling with other CMOS structures. The HP waveguide also has a reduce form factor compared to conventional HP waveguides, providing room for more waveguides closer together.

20 Claims, 23 Drawing Sheets

(56) References Cited

OTHER PUBLICATIONS

Aboketaf et al., "Towards fully automated testing and characterization for photonic compact modeling on 300-mm wafer platform," W6A.1, OFC 2021, OSA 2021, 3 pages.
Bian et al., "3D Integrated Laser Attach Technology on 300-mm Monolithic Silicon Photonics Platform," 978-1-7281-5891-4/20, IEEE 2020, 2 pages.
Bian et al., "Towards low-loss monolithic silicon and nitride photonic building blocks in state-of-the-art 300mm CMOS foundry," FW5D.2, Frontiers in Optics, Laser Science, OSA 2020, 2 pages.
Bian et al., "Monolithically integrated silicon nitride platform," Th1A.46, OFC 2021, OSA 2021, 3 pages.
Bian et al., "Hybrid III-V laser integration on a monolithic silicon photonic platform," M5A.2, OC 2021, OSA 2021, 3 pages.
Bian et al., "Symmetric hybrid surface plasmon polariton waveguides for 3D photonic integration," Optics Express, 17:21320-25, Nov. 9, 2009, 6 pages.
Bian et al., "Highly Confined Hybrid Plasmonic Modes Guided by Nanowire-Embedded-Metal Grooves for Low-Loss Propagation at 1550 nm," IEEE Journal of Selected Topics in Quantum Electronics, 19:4800106, May/Jun. 2013, 7 pages.
Bian and Gong, "Deep-subwavelength light confinement and transport in hybrid dielectric-loaded metal wedges," Laser & Photonics Review, 8:549-61, 2014, 23 pages.
Bian et al., "Low-loss light transport at the subwavelength scale in silicon nano-slot based symmetric hybrid plasmonic waveguiding schemes," Optics Express, 21:23907-20, Oct. 7, 2013, 14 pages.
Chowdhury et al., "High Performance Avalanche Photodiode in a Monolithic Silicon Photonics Technology," W3D.1, OFC 2022, Optical Publishing Group 2022, 3 pages.
Dai and He, "A silicon-based hybrid plasmonic waveguide with a metal cap for a nano-scale light confinement," Optics Express, 17:16646-53, Sep. 14, 2009, 8 pages.
Fedyanin et al., "Ultralow-Loss CMOS Copper Plasmonic Waveguides," Nano Letters, Dec. 2015, 6 pages.
Giewont et al., "300-mm Monolithic Silicon Photonics Foundry Technology," IEEE Journal of Selected Topics in Quantum Electronics, 25:8200611, Sep./Oct. 2019, 12 pages.
Kinsey et al., "Experimental demonstration of titanium nitride plasmonic interconnects," Optics Express, 22:12238-47, May 19, 2014, 10 pages.
Lee et al., "Automatic Waveguide Balancing Using Point Set Operations," M3E.2, OFC 2022, Optical Publishing Group 2022, 3 pages.
Masood et al., "Fabrication and characterization of CMOS-compatible integrated tungsten heaters for thermo-optic tuning in silicon photonics devices," Optical materials Express, 4:1383-88, Jul. 1, 2014, 6 pages.
Peng et al., A CMOS Compatible Monolithic Fiber Attach Solution with Reliable Performance and Self-Alignment, Th31.4, OFC 2020, OSA 2020, 3 pages.
Rakowski et al., "45nm CMOS—Silicon Photonics Monolithic Technology (45CLO) for next-generation, low power and high speed optical interconnects," T3H.3, OFC 2020, OSA 2020, 3 pages.
Reccius et al., "Conformation, Length, and Speed Measurements of Electrodynamically Stretched DNA in Nanochannels," Bioplysical Journal, 95:273-286, Jul. 2008, 14 pages.
Soref et al., "Longwave plasmonics on doped silicon and silicides," Optics Express, 16:6507-14, Apr. 28, 2008, 8 pages.
Stojanovic et al., "Monolithic silicon-photonic platforms in state-of-the-art CMOS SOI processes," Optics Express, 26:13106-21, May 14, 2018, 16 pages.
Zhu et al., "Performance of ultracompact copper-capped silicon hybrid plasmonic waveguide-ring resonators at telecom wavelengths," Optics Express, 20:15232-46, Jul. 2, 2012, 15 pages.
U.S. Appl. No. 17/227,843, filed Apr. 12, 2021, entitled Optical Components with Power-Handling Assistance, 19 pages.
U.S. Appl. No. 17/475,689, filed Sep. 15, 2021, entitled Optical Couplers Including a Back-End-of-Line Grating, 25 pages.
U.S. Appl. No. 17/490,059, filed Sep. 30, 2021, entitled Photonic Integrated Circuit Structure with at Least One Tapered Sidewall Liner Adjacent to a Waveguide Core, 38 pages.
U.S. Appl. No. 17/588,440, filed Jan. 31, 2022, entitled Multiple-Core Heterogeneous Waveguide Structures Including Multiple Slots, 17 pages.
U.S. Appl. No. 17/649,191, filed Jan. 27, 2022, entitled Photonic Devices Integrated with Thermally Conductive Layers, 63 pages.
U.S. Appl. No. 17/679,405, filed Feb. 24, 2022, entitled Optical Components with Enhanced Heat Dissipation, 22 pages.
U.S. Appl. No. 17/705,911, filed Mar. 28, 2022, entitled Slotted Waveguides Including a Metamaterial Structure, 21 pages.

\* cited by examiner

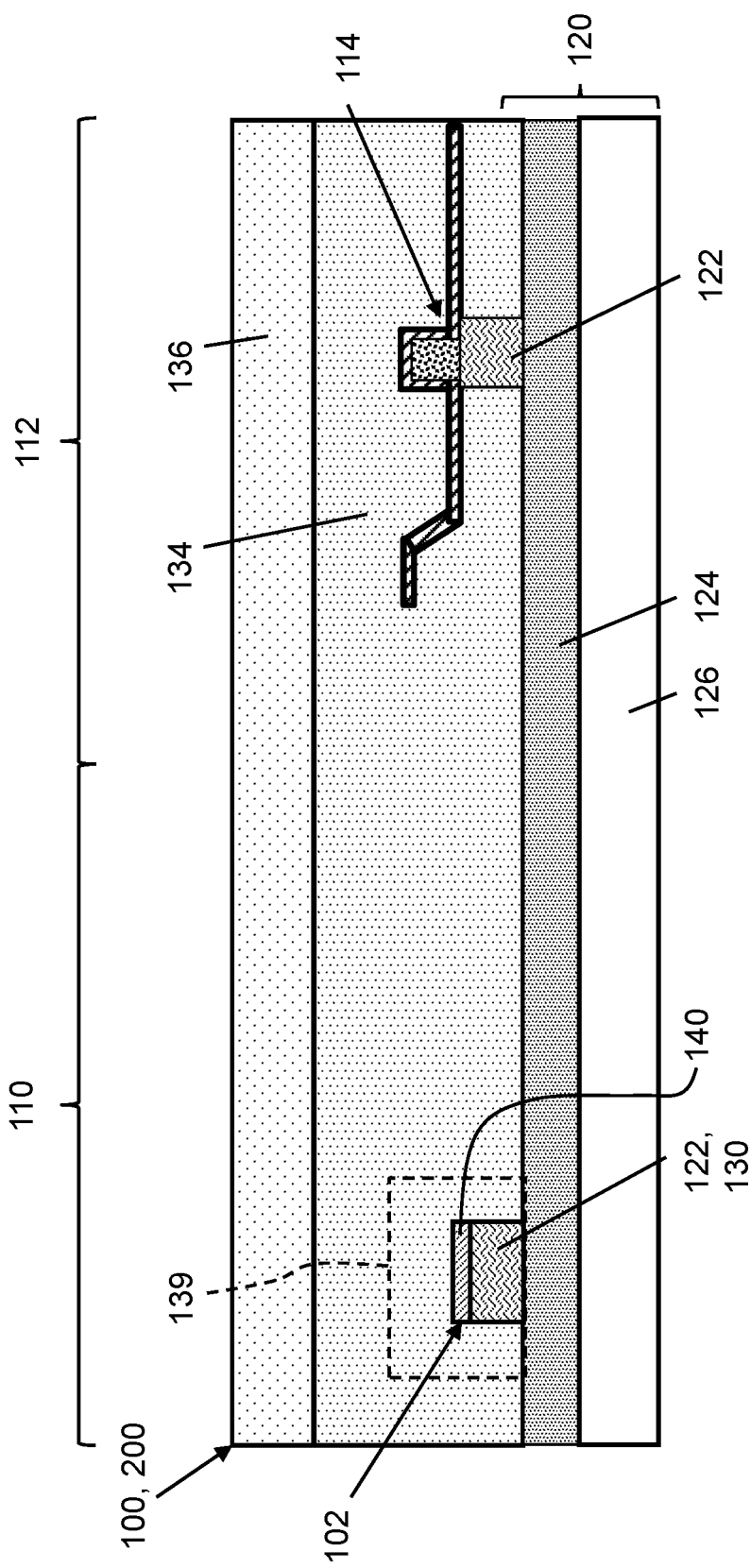

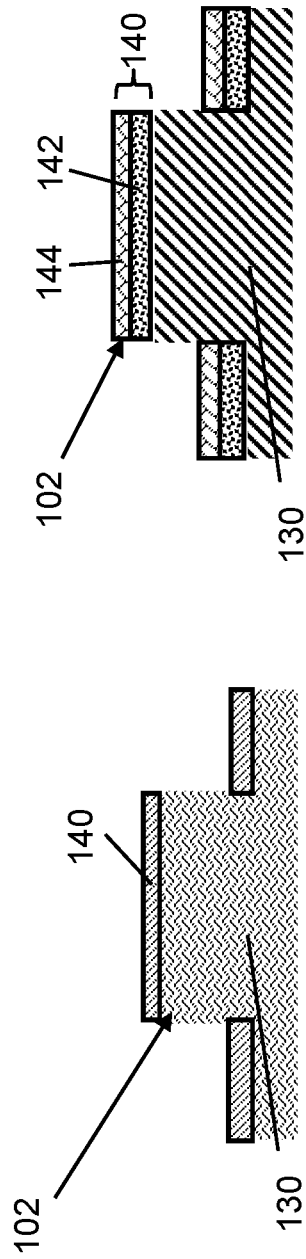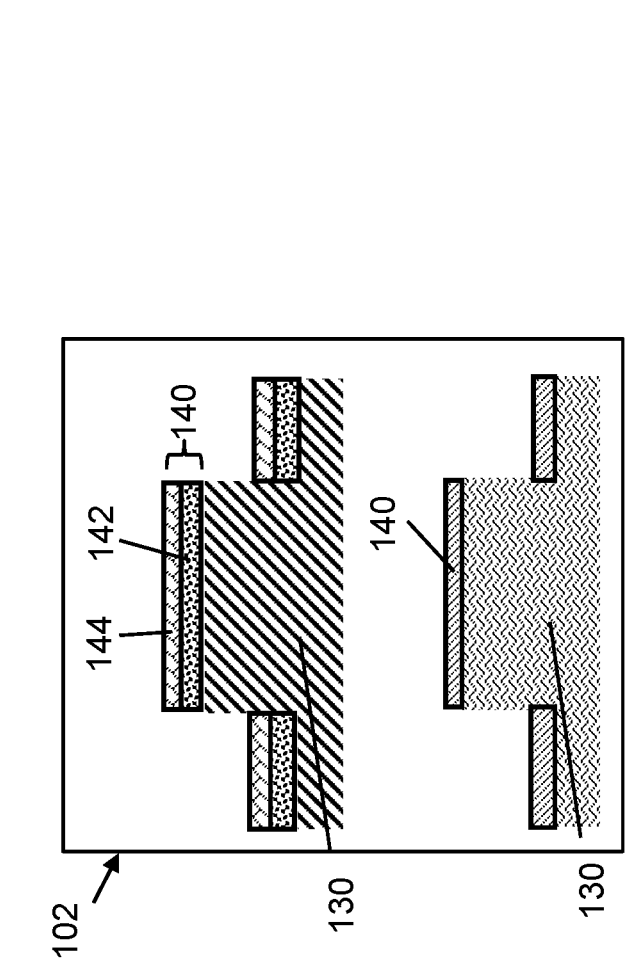

STRUCTURE INCLUDING HYBRID PLASMONIC WAVEGUIDE USING METAL SILICIDE LAYER

BACKGROUND

The present disclosure relates to photonic integrated circuit (PIC) structures and, more particularly, to a structure including a hybrid plasmonic waveguide using a metal silicide layer. The waveguide can be integrated with complementary metal-oxide semiconductor (CMOS) components.

PIC structures have many applications in modern technologies, such as computer servers. PIC structures may include, for example, optical modulators, quantum well (QW) lasers, photodiodes, and waveguides, etc. PIC structures can be made using existing CMOS fabrication techniques, and because silicon is already used as the substrate for most integrated circuits, it is possible to create hybrid devices in which the optical and electronic components are integrated onto a single microchip. Current PIC structures require complex optical communication systems to communicate optical signals therethrough. Typically, dielectric-based waveguides including, for example, silicon or silicon nitride, are used within a PIC structure to communicate optical signals. Hybrid plasmonic waveguides use a combination of dielectric-based waveguide material, such as silicon or silicon nitride, and a pure noble metal, such as gold or silver, to confine the optical signals to a desired path in a more effective manner than just dielectric-based waveguides. Due to the presence of the noble metals, hybrid plasmonic waveguides are incompatible with advanced CMOS fabrication processes. Further, while CMOS devices have continued to be miniaturized, hybrid plasmonic waveguides have not scaled in a similar fashion.

SUMMARY

All aspects, examples and features mentioned below can be combined in any technically possible way.

An aspect of the disclosure provides a structure comprising: a hybrid plasmonic waveguide including: a first waveguide core; and a metal silicide layer contacting the first waveguide core.

An aspect of the disclosure includes a photonic integrated circuit (PIC) structure, comprising: a hybrid plasmonic waveguide including a first waveguide core and a metal silicide layer contacting the first waveguide core; a complementary metal-oxide semiconductor (CMOS) device integrated adjacent the hybrid plasmonic waveguide; and an optical component operatively coupled to the hybrid plasmonic waveguide and configured to communicate an optical signal into or from the hybrid plasmonic waveguide.

An aspect of the disclosure includes a method, comprising: forming a waveguide core in a dielectric layer; and forming a metal silicide layer contacting the waveguide core.

Two or more aspects described in this disclosure, including those described in this summary section, may be combined to form implementations not specifically described herein. The details of one or more implementations are set forth in the accompanying drawings and the description below. Other features, objects and advantages will be apparent from the description and drawings, and from the claims.

BRIEF DESCRIPTION OF THE DRAWINGS

The embodiments of this disclosure will be described in detail, with reference to the following figures, wherein like designations denote like elements, and wherein:

FIG. 1 shows a cross-sectional view of a structure including a hybrid plasmonic waveguide, according to embodiments of the disclosure.

FIGS. 3-5 show cross-sectional views of various alternative waveguide core configurations for hybrid plasmonic waveguides, according to embodiments of the disclosure.

Figure 2A:
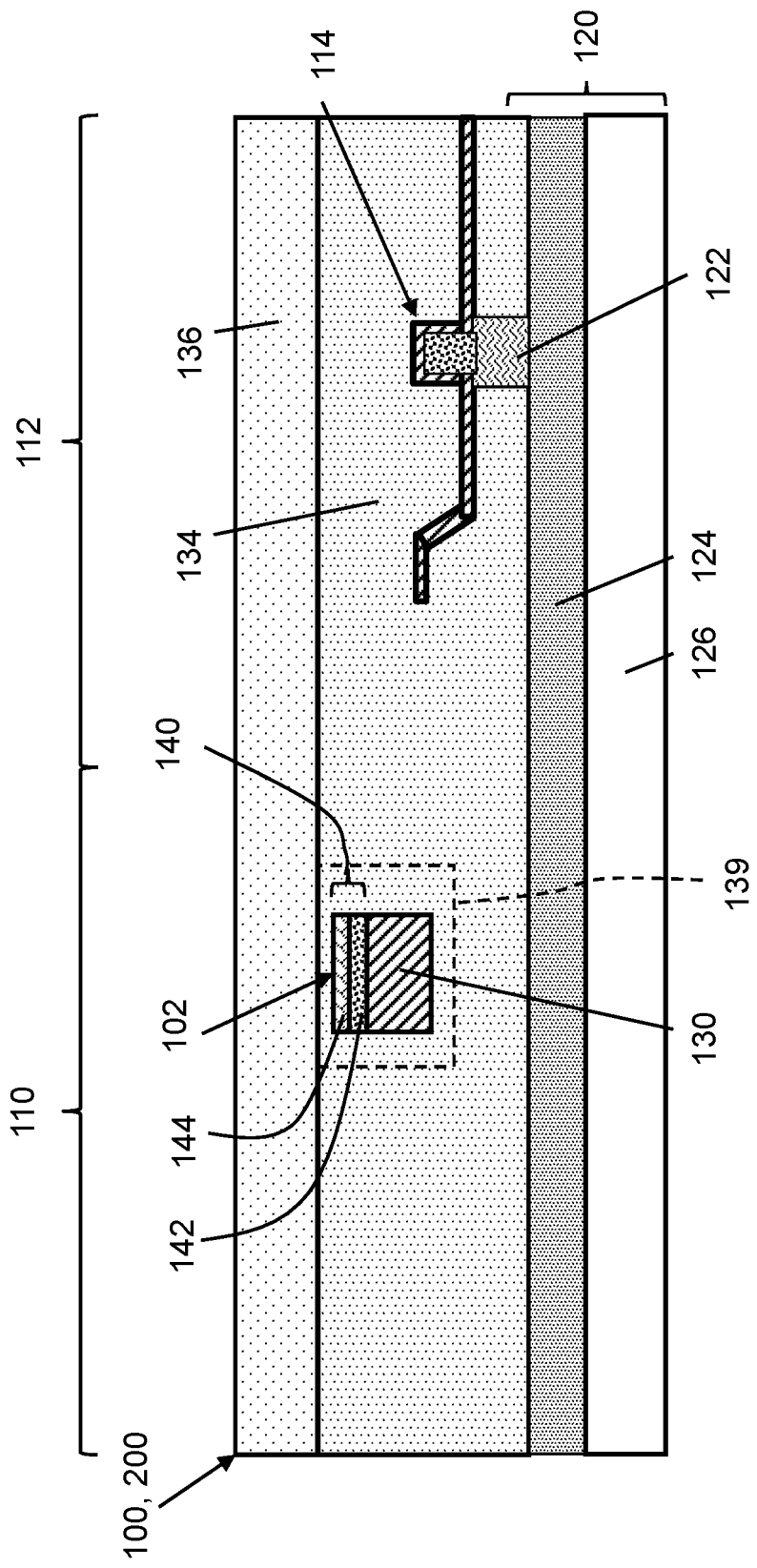
FIGS. 2A-B show cross-sectional views of a structure including a hybrid plasmonic waveguide, according to other embodiments of the disclosure.

It is noted that the drawings of the disclosure are not necessarily to scale. The drawings are intended to depict only typical aspects of the disclosure, and therefore should not be considered as limiting the scope of the disclosure. In the drawings, like numbering represents like elements between the drawings.

DETAILED DESCRIPTION

In the following description, reference is made to the accompanying drawings that form a part thereof, and in which is shown by way of illustration specific illustrative embodiments in which the present teachings may be practiced. These embodiments are described in sufficient detail to enable those skilled in the art to practice the present teachings, and it is to be understood that other embodiments may be used and that changes may be made without departing from the scope of the present teachings. The following description is, therefore, merely illustrative.

It will be understood that when an element such as a layer, region, or substrate is referred to as being "on" or "over" another element, it may be directly on the other element or intervening elements may also be present. In contrast, when an element is referred to as being "directly on" or "directly over" another element, there may be no intervening elements present. It will also be understood that when an element is referred to as being "connected" or "coupled" to another element, it may be directly connected or coupled to the other element or intervening elements may be present. In contrast, when an element is referred to as being "directly connected" or "directly coupled" to another element, there are no intervening elements present.

Reference in the specification to "one embodiment" or "an embodiment" of the present disclosure, as well as other variations thereof, means that a particular feature, structure, characteristic, and so forth described in connection with the embodiment is included in at least one embodiment of the present disclosure. Thus, the phrases "in one embodiment" or "in an embodiment," as well as any other variations appearing in various places throughout the specification are not necessarily all referring to the same embodiment. It is to be appreciated that the use of any of the following "/," "and/or," and "at least one of," for example, in the cases of "A/B," "A and/or B" and "at least one of A and B," is intended to encompass the selection of the first listed option (a) only, or the selection of the second listed option (B) only, or the selection of both options (A and B). As a further example, in the cases of "A, B, and/or C" and "at least one of A, B, and C," such phrasing is intended to encompass the first listed option (A) only, or the selection of the second listed option (B) only, or the selection of the third listed option (C) only, or the selection of the first and the second listed options (A and B), or the selection of the first and third listed options (A and C) only, or the selection of the second and third listed options (B and C) only, or the selection of all three options (A and B and C). This may be extended, as readily apparent by one of ordinary skill in the art, for as many items listed.

Embodiments of the disclosure provide a structure including a hybrid plasmonic waveguide. The waveguide includes a waveguide core, and a metal silicide layer contacting the waveguide core. The metal silicide layer replaces noble metals typically provided in hybrid plasmonic waveguides, and may provide improved optical signal containment characteristics, e.g., refractive indices of at least 1.9 compared to that for gold (0.4) or silver (0.1). The metal silicide layer is also compatible with CMOS fabrication techniques, and capable of additional scaling with other CMOS structures. The HP waveguide also has a reduced form factor compared to conventional HP waveguides, providing room for more waveguides closer together. As will be further described, the hybrid plasmonic waveguide including a metal silicide layer can be used in a number of configurations that provide various advantages.

Figure 2B:
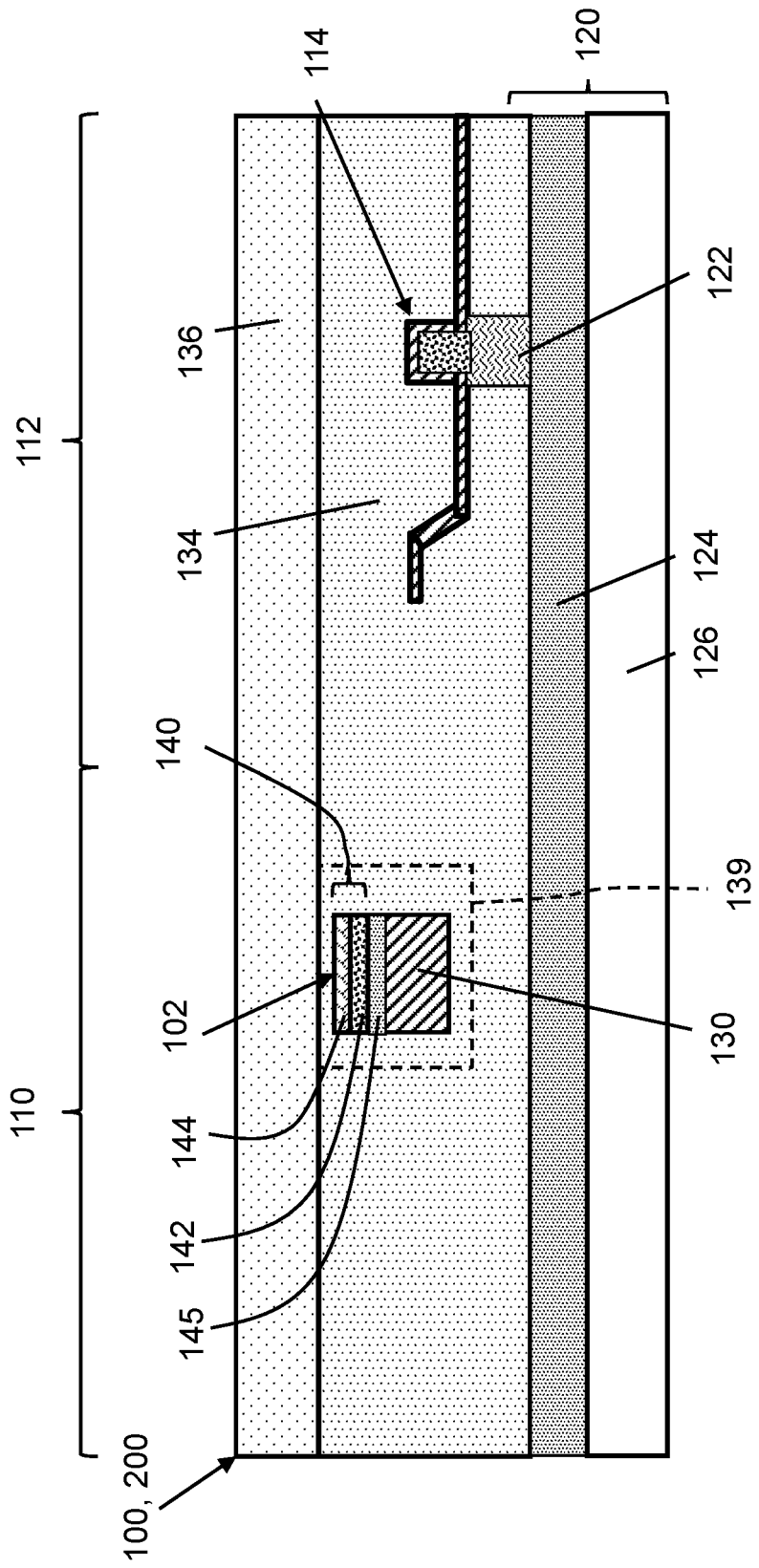

FIG. 1 shows a cross-sectional view of a structure 100 including a hybrid plasmonic waveguide 102, and FIGS. 2A-B show cross-sectional views of a structure 100 including a hybrid plasmonic waveguide 102, according to embodiments of the disclosure. As shown in FIGS. 1 and 2A-B, structure 100 includes a photonics region 110 and a complementary metal-oxide semiconductor (CMOS) region 112. Photonics region 110 may include any form of photonics components such as edge couplers, grating coupler, modulators, photodetectors, optical component attachments, waveguides, etc. Photonics region 110 includes one or more hybrid plasmonic waveguides 102 according to embodiments of the disclosure. CMOS region 112 of structure 100 may include any form of active or passive CMOS device 114 such as but not limited to transistors (one shown), resistors, capacitors, and related interconnects. Hence, structure 100 includes CMOS device(s) 114 integrated adjacent hybrid plasmonic waveguide(s) 102 and other optical components 139. It will be recognized that regions 110, 112 may not have a sharp delineation and may be laterally intertwined with various devices operatively interacting, e.g., photodetectors and transistors.

Structure 100 and regions 110, 112 thereof may include any now known or later developed semiconductor substrate 120. In the example shown, semiconductor substrate 120 is illustrated and described as a semiconductor-on-insulator (SOI) substrate. SOI substrate includes a layered semiconductor-insulator-semiconductor substrate in place of a more conventional silicon substrate (bulk substrate). Substrate 120 includes a semiconductor-on-insulator (SOI) layer 122 over a buried insulator layer 124 over a base semiconductor layer 126. SOI layer 122 and base semiconductor layer 126 may include but are not limited to: silicon, germanium, silicon germanium, silicon carbide, and those consisting essentially of one or more III-V compound semiconductors. Buried insulator layer 124 may include any appropriate dielectric such as but not limited to silicon dioxide, i.e., forming a buried oxide (BOX) layer. A portion of or the entire semiconductor substrate may be strained. The precise thickness of buried insulating layer 124 and SOI layer 122 may vary widely with the intended application. Other substrate configurations, such as bulk semiconductor substrates, are also possible.

Structure 100 includes one or more hybrid plasmonic waveguides 102 in photonics region 110. Each hybrid plasmonic waveguide 102 (hereafter "HP waveguide 102") may include a waveguide core 130. Waveguide core 130 can be made of any suitable waveguide core material. For example, in FIG. 1, waveguide core 130 may be a silicon (Si) waveguide core (e.g., with a refractive index of 3 or larger and typically between 3.3 and 3.6). In contrast, in FIGS. 2A-B, waveguide core 130 may be a silicon nitride (SiN) waveguide core with a refractive index of approximately 2.0. Waveguide core 130 may alternatively include any other suitable waveguide core material such as but not limited to one of: crystalline silicon (c-Si), amorphous silicon (a-Si), polysilicon (polySi), polysilicon germanium (polySiGe), silicon nitride (SiN), silicon oxynitride (SiON), gallium nitride (GaN), and aluminum nitride (AlN). In FIG. 1, waveguide core 130 includes the same material as SOI layer 122, e.g., silicon. Hence, in FIG. 1, waveguide core 130 is at a same level as SOI layer 122. Waveguide core 130 of silicon can be formed in a similar manner that SOI layer 122 is patterned for other devices, e.g., deposition and patterning using lithography techniques. In FIGS. 2A-B, waveguide core 130 includes silicon nitride. In FIGS. 2A-B, waveguide core 130 can be in any interlayer dielectric layer (ILD) 134, 136. Waveguide core 130 of silicon nitride can be formed in a similar manner as silicon nitride waveguides are formed, e.g., patterned a trench in ILD layer(s) 134, 136 using lithography techniques, depositing silicon nitride and planarizing.

ILD layers 134, 136 may include any now known or later developed dielectric material such as but not limited to: silicon oxide ($SiO_2$), fluorinated $SiO_2$ (FSG), hydrogenated silicon oxycarbide (SiCOH), porous SiCOH, boro-phospho-silicate glass (BPSG), silsesquioxanes, carbon (C) doped oxides (i.e., organosilicates) that include atoms of silicon (Si), carbon (C), oxygen (O), and/or hydrogen (H), or other low dielectric constant (<3.9) material, or layers thereof.

Each HP waveguide 102 may also include a metal silicide layer 140 contacting waveguide core 130 thereof. Metal silicide layer 140 creates a plasmonic mode for optical signals within HP waveguide 102 to better confine an optical signal in HP waveguide 102 compared to just dielectric waveguides. The optical signal confinement is similar to or better than hybrid plasmonic waveguides in which a noble metal layer is used, while demonstrating comparable or even lower optical loss. For example, if waveguide core 130 is silicon, it has a refractive index between 3.3 and 3.6 or if waveguide core 130 is silicon nitride, it has a refractive index of approximately 2. In contrast, metal silicide layer 140 may a refractive index of no more than 1.9. Metal silicide layer 140 formation is also compatible with CMOS fabrication—the process is common for forming electrical contacts to silicon. In contrast to metal silicide layers in other CMOS devices, metal silicide layer 140 in HP waveguide 102 is devoid of any contacts thereto.

As recognized in the art, metal silicide is a binary compound of silicon and another metal element, such as nickel, titanium or cobalt. The type and arrangement of metal silicide layer 140 can vary depending on the form of waveguide core 130. In certain embodiments, metal silicide layer 140 includes one of nickel, titanium and cobalt. In certain embodiments, as in FIG. 1, waveguide core 130 may include silicon and metal silicide layer 140 includes one of nickel silicide, titanium silicide and cobalt silicide. In other embodiments, metal silicide layer 140 may include a number of layers. For example, in certain embodiments as previously noted and as shown in FIGS. 2A-B, waveguide core 130 includes silicon nitride. Silicon nitride requires a metal polysilicide layer 142 be formed thereon in order to form a metal silicide, upper layer 144, which may be a metal crystalline silicide. Hence, metal silicide layer 140 includes metal polysilicide layer 142 between waveguide core 130 and metal crystalline silicide, upper layer 144. Where the metal of metal silicide layer 140 includes nickel, HP waveguide 102 includes a nickel silicide layer (layer 144) on a nickel polysilicide layer (layer 142). In another option, where the metal of metal silicide layer 140 includes titanium, HP waveguide 102 includes a titanium silicide layer (layer 144) on a titanium polysilicide layer (layer 142). In another option, where the metal of metal silicide layer 140 includes cobalt, HP waveguide 102 includes a cobalt silicide layer (layer 144) on a cobalt polysilicide layer (layer 142). Hence, in certain embodiments, metal silicide layer 140 includes one of: nickel silicide layer (layer 144) on nickel polysilicide layer (layer 142), titanium silicide layer (layer 144) on titanium polysilicide layer (layer 142), and cobalt silicide layer (layer 144) on cobalt polysilicide layer (layer 142). FIG. 2B includes an optional oxide layer 145, e.g., silicon oxide, between waveguide core 130 and metal polysilicide layer 142. Oxide layer 145 acts as a buffer layer between waveguide core 130 and metal polysilicide layer 142. Oxide layer 145 also maintains strong optical confinement while reducing propagation loss.

Metal silicide layer 140 may be formed using any now known or later developed technique. For example, where metal silicide layer 140 will form without polysilicon, e.g., on silicon or silicon oxide, the process may include performing an in-situ pre-clean on waveguide core 130 (e.g., with diluted hydrofluoric acid), depositing an appropriate metal or metal alloy for the desired type of silicide, annealing to have the metal react with silicon or polysilicon to form metal silicide layer 140, and removing unreacted metal (e.g., using any appropriate stripping process(es)). Removing unreacted metal may be performed using any appropriate etching process for the metal, such as reactive ion etching. Where a polysilicon layer is required, e.g., on silicon nitride, the polysilicon layer (not shown) may be deposited using any appropriate deposition technique, e.g., chemical vapor deposition, prior to performing the above-described process. In this latter case, during the annealing, the metal reacts with the polysilicon layer (not shown) to initially form metal polysilicide layer 142 and then eventually forms metal silicide, upper layer 144 on metal polysilicide layer 142. Where oxide layer 145 is provided, it may be formed, e.g., by any appropriate deposition technique, before the polysilicon layer.

Each given HP waveguide 102 may have a wide range of vertical cross-sectional and horizontal, lateral configurations.

As shown in FIGS. 1-2, HP waveguide 102 can have a vertical cross-sectional shape cutting across its width that is essentially square or rectangular with a planar bottom surface, a planar top surface opposite the planar bottom surface, and opposing sidewalls—see e.g., FIGS. 1-2. Alternatively, HP waveguide 102 could have some other suitable geometry (e.g., a rib geometry, etc.). For example, FIG. 3 shows a cross-sectional view of HP waveguide 102 with waveguide core 130 of silicon having a ribbed geometry; FIG. 4 shows a cross-sectional view of HP waveguide 102 with waveguide core 130 of silicon nitride having a ribbed geometry; and FIG. 5 shows a cross-sectional view of an HP waveguide 102 with waveguide core 130 of silicon having a ribbed geometry stacked over waveguide core 130 of silicon nitride having a ribbed geometry. Ribbed geometry indicates part of the waveguide core extends from another part thereof forming, for example, an inverted T-shape. Other vertical cross-sectional shapes are also possible.

FIGS. 6-10 and 20-25 show schematic top-down views of horizontal, lateral configurations of HP waveguide 102. Metal silicide layer 140 may extend over waveguide core 130 in any manner to provide improved optical signal confinement compared to just dielectric waveguides. Note, as an illustration convention in FIGS. 6-10 and 20-25, HP waveguides 102 including silicon nitride waveguide core 130 are shown within an ILD 134, 136, while HP waveguides 102 including silicon waveguide core 130 are shown without ILD 134, 136. It is understood that silicon waveguide core 130 is formed on buried insulator layer 124 (FIGS. 1-2) and is surrounded by an ILD layer. In addition, for purposes of illustration in the schematic top-down views, waveguide core 130 is shown as laterally larger than metal silicide layer 140 thereon. It is emphasized that they may be the same size, see e.g., FIGS. 1-2 and 11-19

Figure 6:
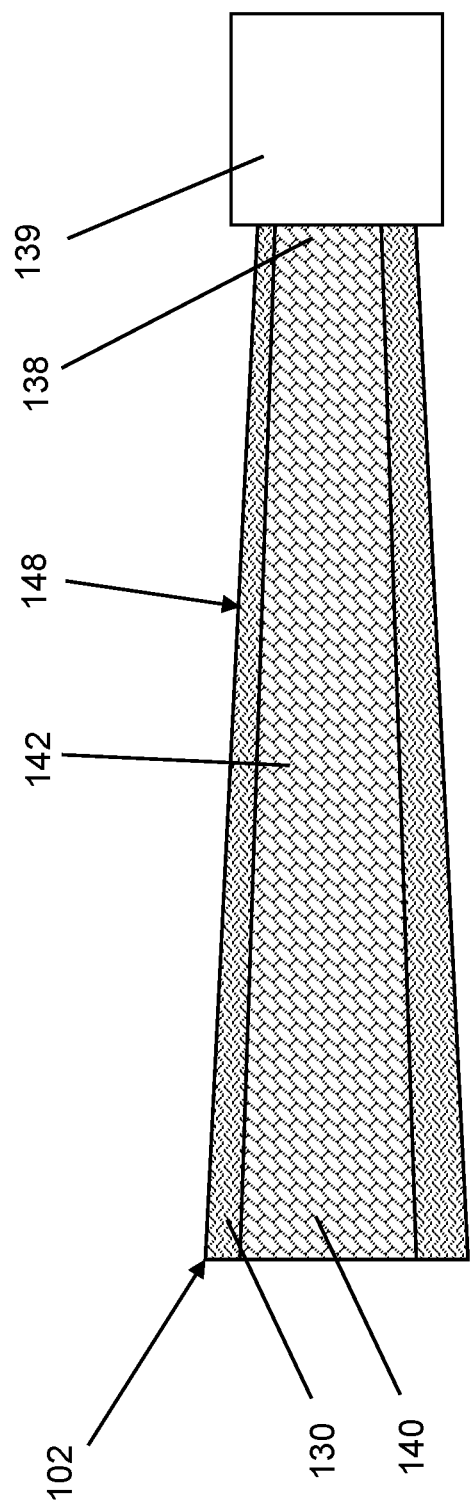
FIG. 6 shows a schematic top-down view of a structure including a hybrid plasmonic waveguide and an optical component, according to embodiments of the disclosure.

HP waveguide 102 can have a strip/wire geometry. That is, HP waveguide 102 can have an elongated body. In addition, HP waveguide(s) 102 can be essentially linear, as illustrated in FIG. 6. FIG. 6 also shows an illustrative HP waveguide 102 including a tapered configuration. Alternatively, as shown in examples in the schematic top-down view of FIGS. 7-8, HP waveguide 102 could have one or more curved sections 146. As shown in FIG. 6, in any event, HP waveguide 102 can have an end portion(s) 138 that can be configured to function as a coupler on one side of an optical interface (not shown) that facilitates communication of light signals between HP waveguide 102 (i.e., waveguide core 130 thereof) and an optical component 139, e.g., a photodetector. Note, optical component 139 is illustrated in other drawings with dashed box for clarity.

Figure 7:
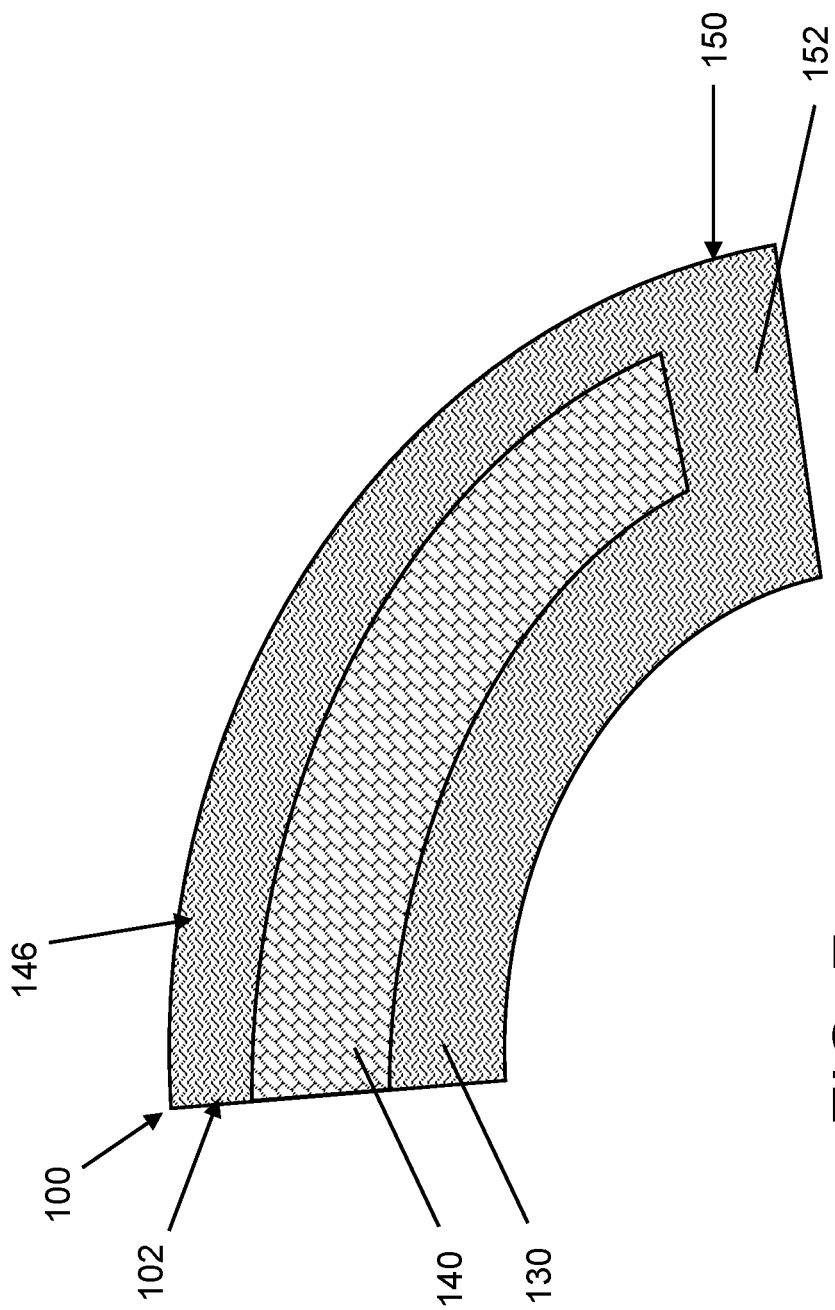
FIG. 7 shows a schematic top-down view of a structure including a hybrid plasmonic waveguide in a curved configuration, according to embodiments of the disclosure.
Figure 8:
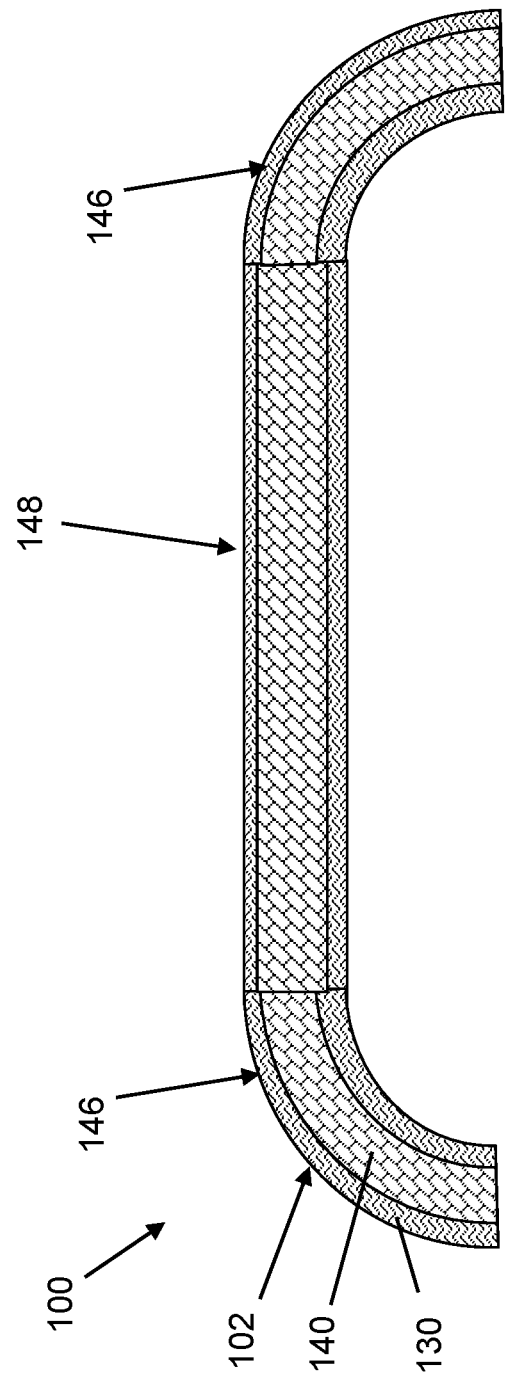
FIG. 8 shows a schematic top-down view of a structure including a hybrid plasmonic waveguide, according to embodiments of the disclosure.
Figure 9:
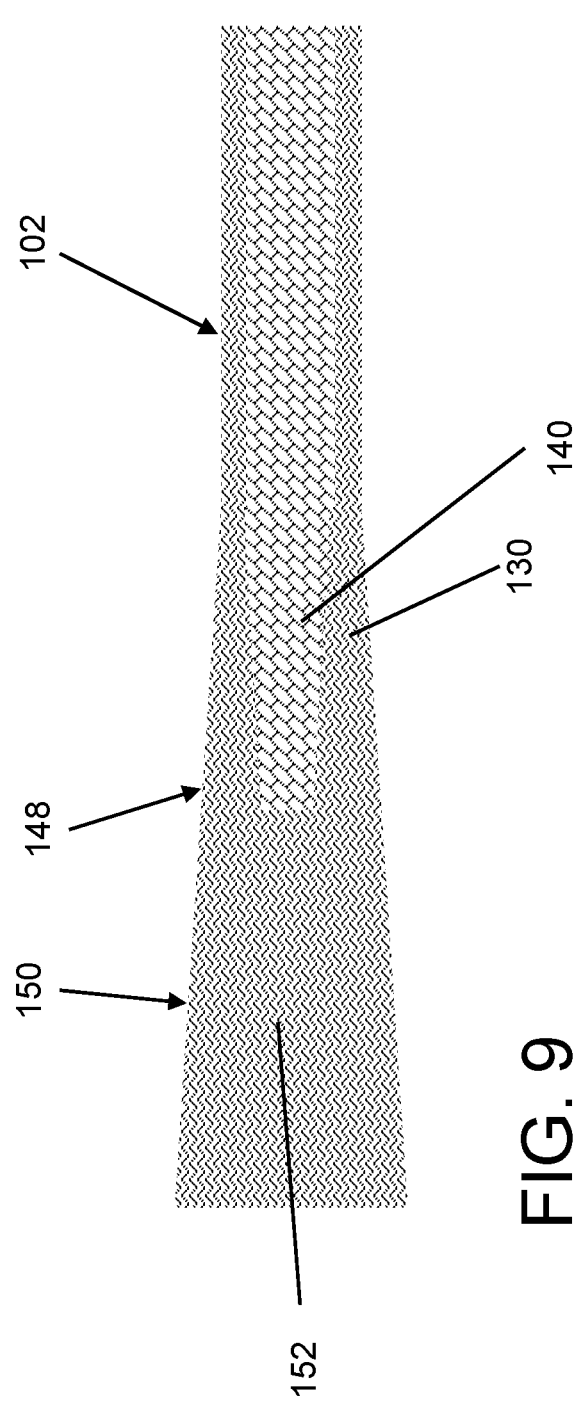
FIG. 9 shows a schematic top-down view of a structure including a hybrid plasmonic waveguide in a tapered configuration, according to additional embodiments of the disclosure.
Figure 10:
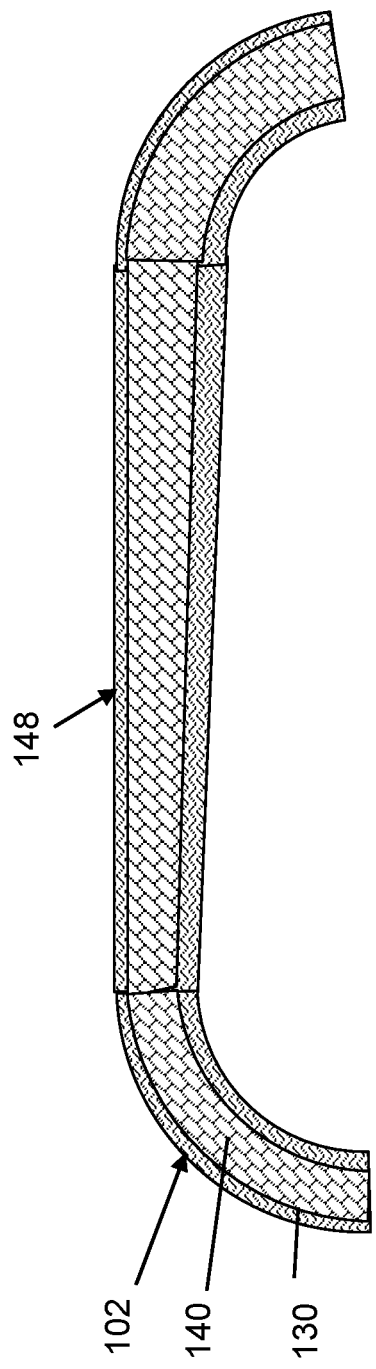
FIG. 10 shows a schematic top-down view of a structure including a hybrid plasmonic waveguide in another curved and tapered configuration, according to other embodiments of the disclosure.

As shown in FIG. 6 and the schematic top-down views of FIGS. 9-10, HP waveguide 102 can be tapered or include a tapered portion 148. That is, as shown in FIG. 6, the width of a portion thereof can decrease. For example, as shown in FIG. 6, HP waveguide 102 decreases in width between a main body 142 and the distal end portion 138. However, it should be understood that the figures are not intended to be limiting and that, alternatively, end portion 138 could have any suitable shape and size to function as a coupler, given the optical interface at issue. For example, end portion 138 could have a uniform width, could increase in width between main body 142 and the distal end portion 138, could be split (e.g., forked) with two or more uniform-width or tapered extensions, could be configured as a grating coupler, etc. FIGS. 7, 9, and 10 show other example HP waveguides 102 with tapered portions 148.

Metal silicide layer 140 can cover all of its respective waveguide core 130 (as in FIGS. 1-5). That is, in certain embodiments, metal silicide layer 140 co-extends along a length of waveguide core 130. In other words, metal silicide layer 140 extends along the entire longitudinal extent of waveguide core 130. Alternative, metal silicide layer 140 can cover only part of a respective waveguide core 130, e.g., as in FIGS. 7 and 9. As shown in FIG. 9, for example, where only a portion of waveguide core 130 includes metal silicide layer 140 thereon, the arrangement includes HP waveguide 102 and a dielectric waveguide 150 directly optically coupled to one another. That is, structure 100 also includes dielectric waveguide 150 including a waveguide core 152 (shared with waveguide core 130 of HP waveguide 102) including a dielectric. Dielectric waveguide 150 is devoid of the metal silicide layer contacting waveguide core 152 thereof. Dielectric waveguide 150 is operatively coupled to hybrid plasmonic waveguide 102 allowing an optical signal to communicate between the waveguides with no intervening material or structure. More particularly, in these embodiments, dielectric waveguide 152 is directly (physically) operatively coupled to HP waveguide 102 thereunder. In the example shown, dielectric waveguide 150 includes silicon waveguide core 152, and HP waveguide 102 includes silicon waveguide core 130 (with metal silicide layer 140 thereon). However, dielectric waveguide 150 may include any now known or later developed dielectric waveguide 150 arrangement, e.g., silicon (shown) or silicon nitride, perhaps with a conventional cladding layer (not shown). FIG. 7 shows another example where only a portion of waveguide core 130 includes metal silicide layer 140 thereon, and the arrangement include HP waveguide 102 and a conventional dielectric waveguide 150 directly optically coupled to one another. It will be recognized that while FIGS. 7-10 show waveguide core 130 as silicon, the teachings of those drawings are equally applicable to any form of waveguide core 130 described herein, e.g., silicon nitride, among others.

Figure 11:
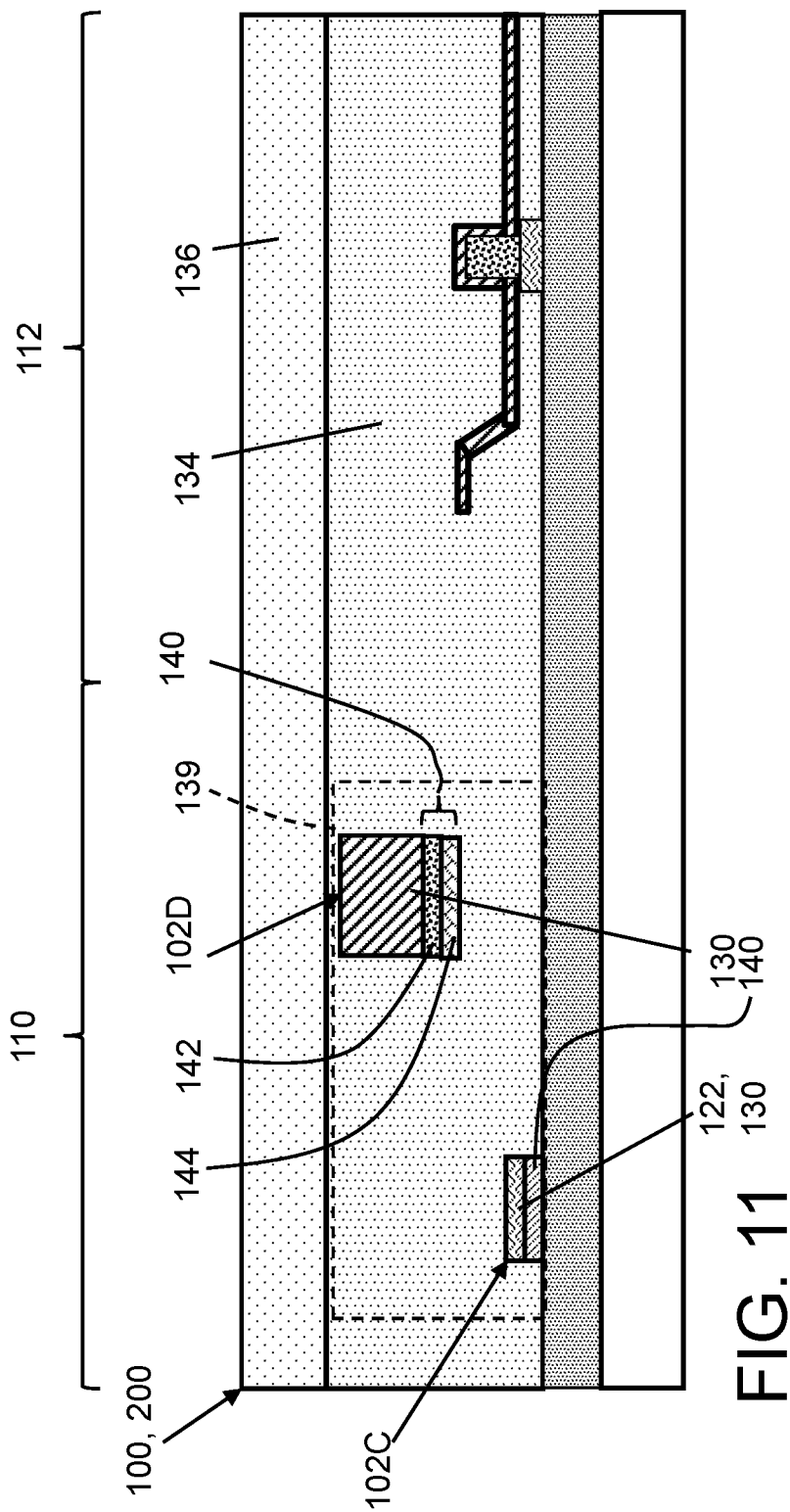
FIG. 11 shows a cross-sectional view of a structure including a hybrid plasmonic waveguide, according to other embodiments of the disclosure.

In FIGS. 1-10, HP waveguides 102 include metal silicide layer 140 over waveguide core 130. In other embodiments of structure 100, as shown in the cross-sectional view of FIG. 11, metal silicide layer 140 may be under waveguide core 130. The coverage of metal silicide layer 140 under waveguide core 130 can be as described for any embodiment herein in which metal silicide layer 140 is over waveguide core 130. While FIG. 11 shows an illustrative HP waveguide with sections 102C, 102D, they can be used independently or in any arrangement of waveguides described herein.

A plurality of HP waveguides 102, perhaps with dielectric waveguides (e.g., 150 (FIG. 9)), can be used together to better communicate an optical signal. FIGS. 12-19 show cross-sectional views of various embodiments of structure 100 in which more than one waveguide is employed. In addition, FIGS. 12-19 show structure 100 including CMOS device 114 integrated adjacent HP waveguide 102.

Figure 12:
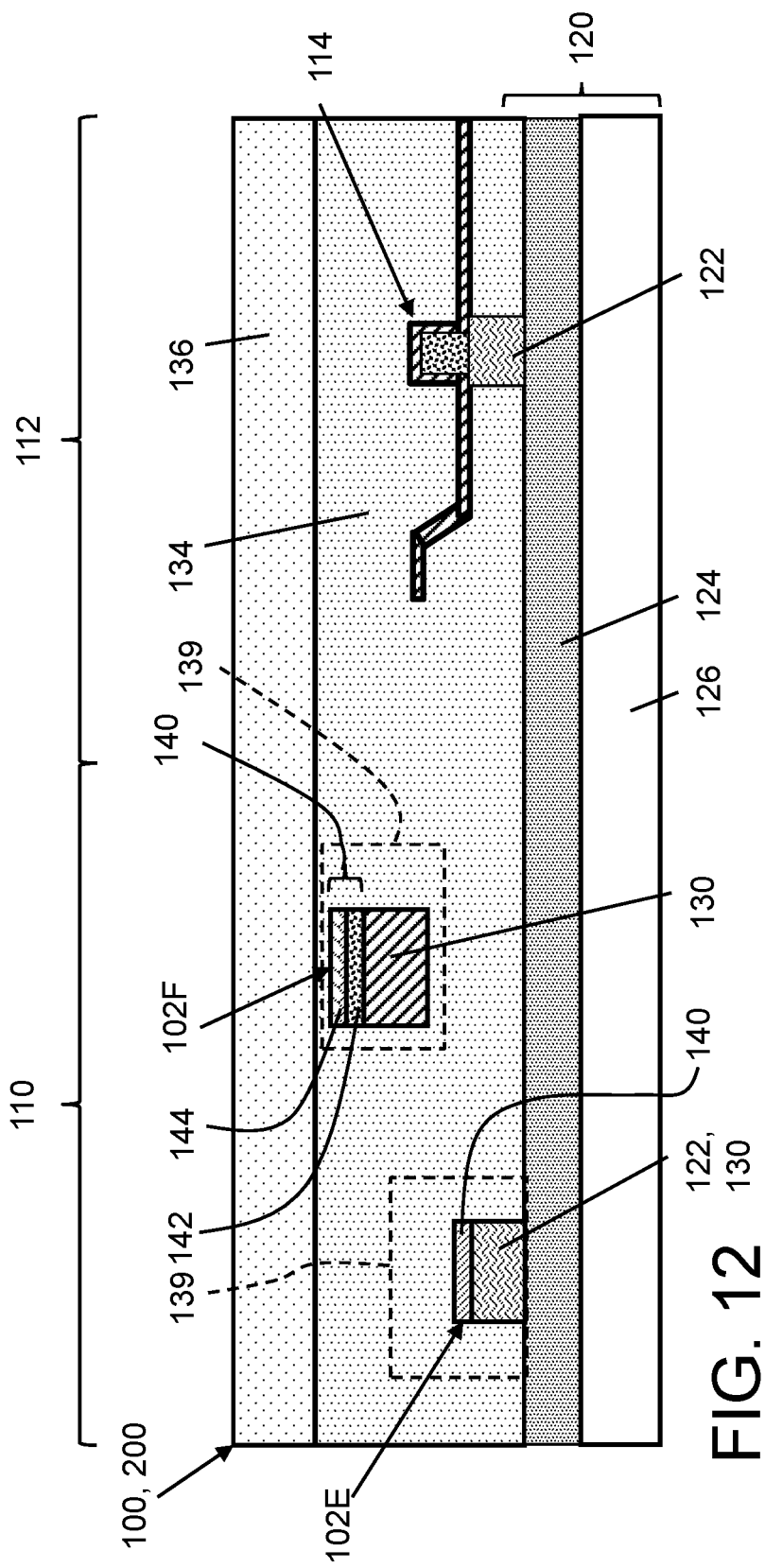
FIG. 12 shows a cross-sectional view of a structure including the hybrid plasmonic waveguides of FIGS. 1 and 2 together, according to embodiments of the disclosure.

FIG. 12 shows structure 100 including a combination of a silicon-based HP waveguide 102E (as in FIG. 1) with a silicon nitride-based HP waveguide 102F (as in FIGS. 2A-B). Here, each HP waveguide 102E, 102F may carry a different optical signal, e.g., to/from different optical components 139 (dashed boxes). Each HP waveguide 102E, 102F may be operatively coupled to a different optical component 139.

Figure 13:
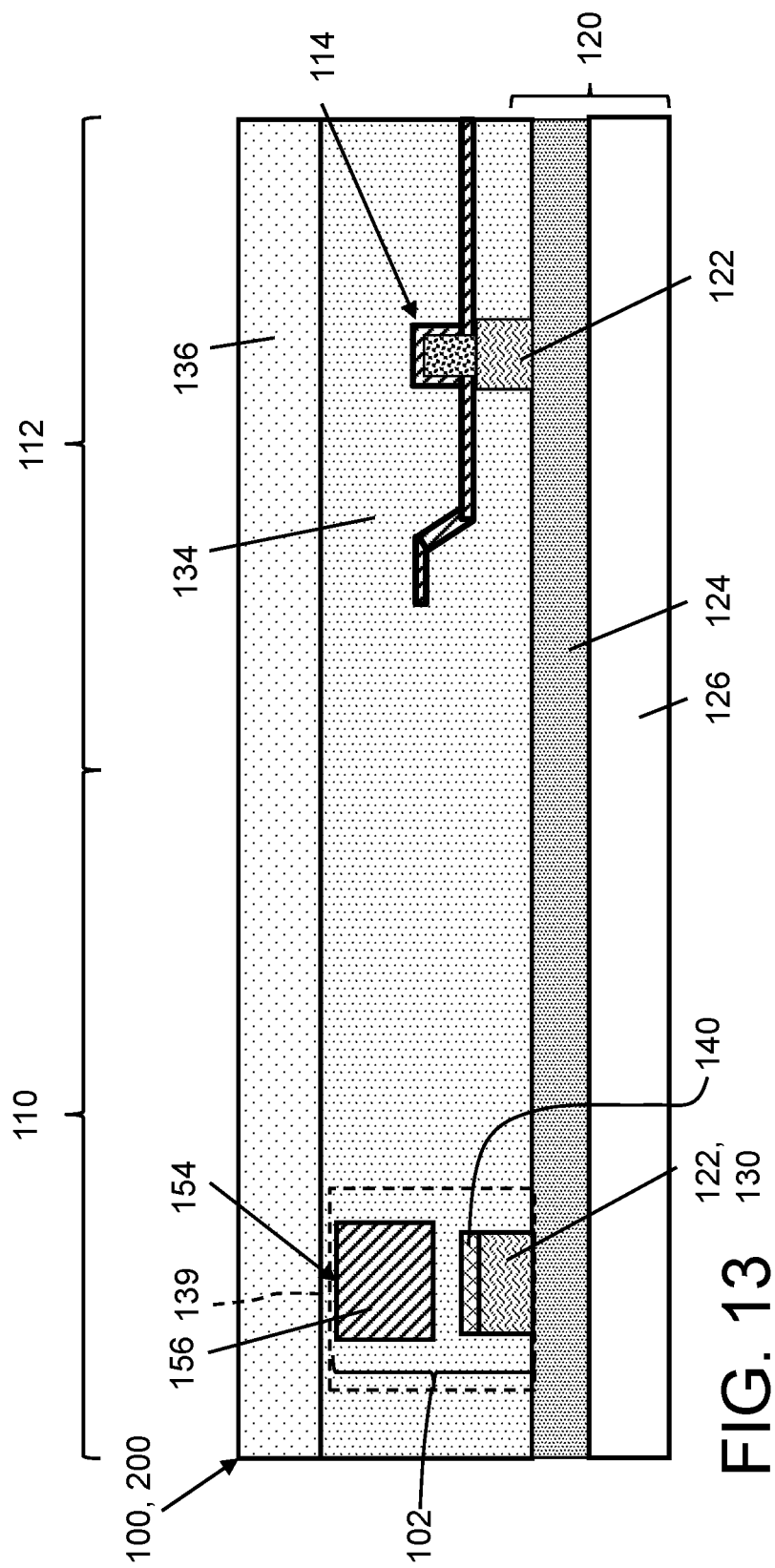
FIG. 13 shows a cross-sectional view of a structure including a hybrid plasmonic waveguide and a dielectric waveguide, according to embodiments of the disclosure.

Stacked and laterally adjacent waveguides may provide better confinement and reduced leakage into substrate 120. FIG. 13 shows structure 100 including a dielectric waveguide 154 including a waveguide core 156 including a dielectric. Dielectric waveguide 154 is devoid of the metal silicide layer contacting waveguide core 156 thereof. Dielectric waveguide 154 is part of HP waveguide 102 and is stacked over and operatively coupled to the rest of HP waveguide 102. More particularly, in these embodiments, dielectric waveguide 154 is adiabatically operatively coupled to the rest of HP waveguide 102 thereunder, i.e., they are not physically connected but there is dielectric, such as ILD 134, therebetween through which an optical signal may communicate between the waveguides. In the example shown, dielectric waveguide 154 includes a silicon nitride waveguide core 156, and the rest of HP waveguide 102 includes a silicon waveguide core 130 (with metal silicide layer 140 thereon). Metal silicide layer 140 is between waveguide cores 130, 156, as is part of ILD 134. In FIG. 13, HP waveguide 102 is operatively coupled to component 139. In this manner, embodiments including stacked waveguides such as HP waveguides 102 (FIGS. 14, 18) and/or an HP waveguide 102 with a dielectric waveguide 150 (FIG. 13) may provide better confinement and reduced leakage into substrate 120.

Figure 14:
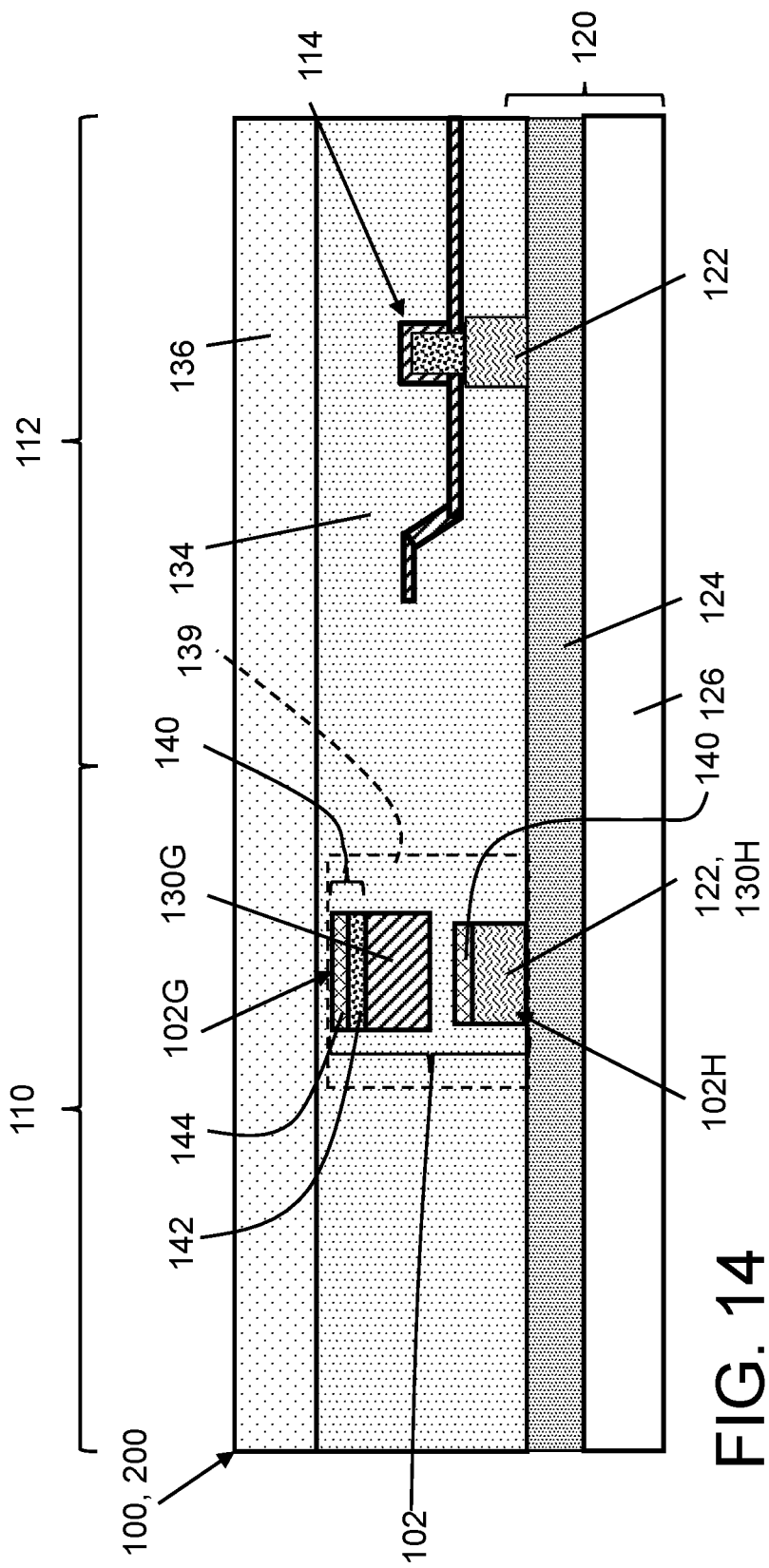
FIG. 14 shows a cross-sectional view of a structure including two stacked hybrid plasmonic waveguides having different waveguide cores, according to other embodiments of the disclosure.

FIG. 14 shows structure 100 including a first HP waveguide portion 102G over a second HP waveguide portion 102H, collectively forming HP waveguide 102. Waveguide cores 130G, 130H of first and second hybrid plasmonic waveguide portions 102G, 102H include different materials. For example, HP waveguide portion 102G includes a silicon nitride waveguide core 130G and HP waveguide portion 102H includes a silicon waveguide core 130H. Each HP waveguide portion 102G, 102H may be operatively coupled to the same optical component 139.

Figure 15:
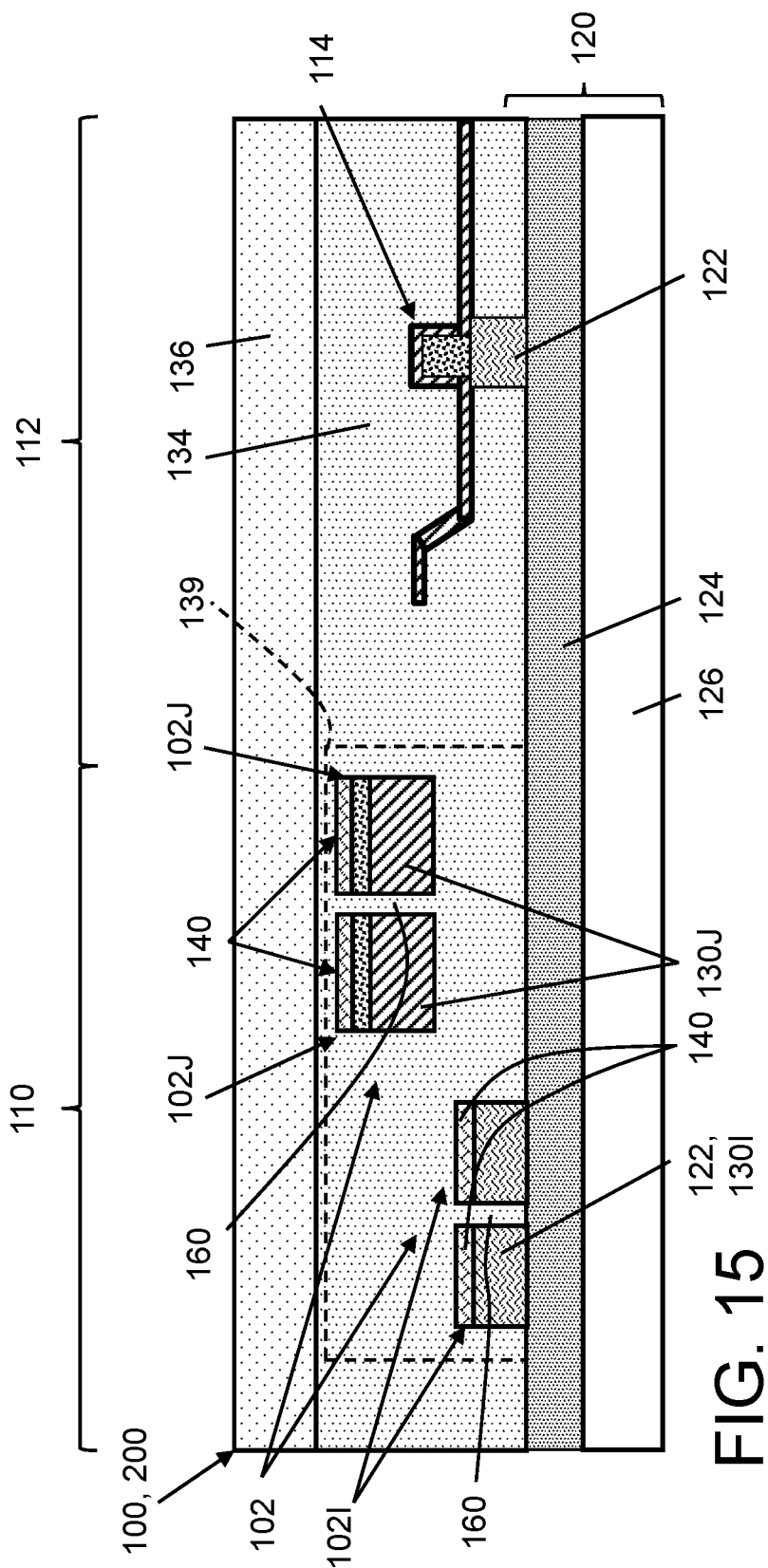
FIG. 15 shows a cross-sectional view of a structure including pluralities of laterally adjacent hybrid plasmonic waveguides, according to additional embodiments of the disclosure.

FIG. 15 shows structure 100 including a plurality of first HP waveguide portions 102I laterally adjacent one another and a plurality of second HP waveguide portions 102J laterally adjacent one another. Collectively, waveguide portions 102I, 102J form HW waveguide 102. In this embodiment, the two pluralities of HP waveguide portions are not stacked but laterally offset. More particularly, in the example shown, first HP waveguide portions 102I are in a lower dielectric layer of structure 100 than second waveguide portions 102J, e.g., a via layer (VO) over an active layer (SOI layer 122) of CMOS device 114 versus first metal layer (ILD 134). In these embodiments, waveguide cores 130I, 130J of first and second hybrid plasmonic waveguide portions 102I, 102J include different materials. For example, HP waveguide portions 102I include silicon waveguide cores 130I and HP waveguide portions 102J include silicon nitride waveguide cores 130J. Each of the plurality of hybrid plasmonic waveguide portions 102I or 102J are laterally spaced from an adjacent hybrid plasmonic waveguide portion by a dielectric spacer 160, e.g., of ILD 134. Each set of HP waveguide portions 102I, 102J may be operatively coupled to different optical components 139, or the same optical component 139.

Figure 16:
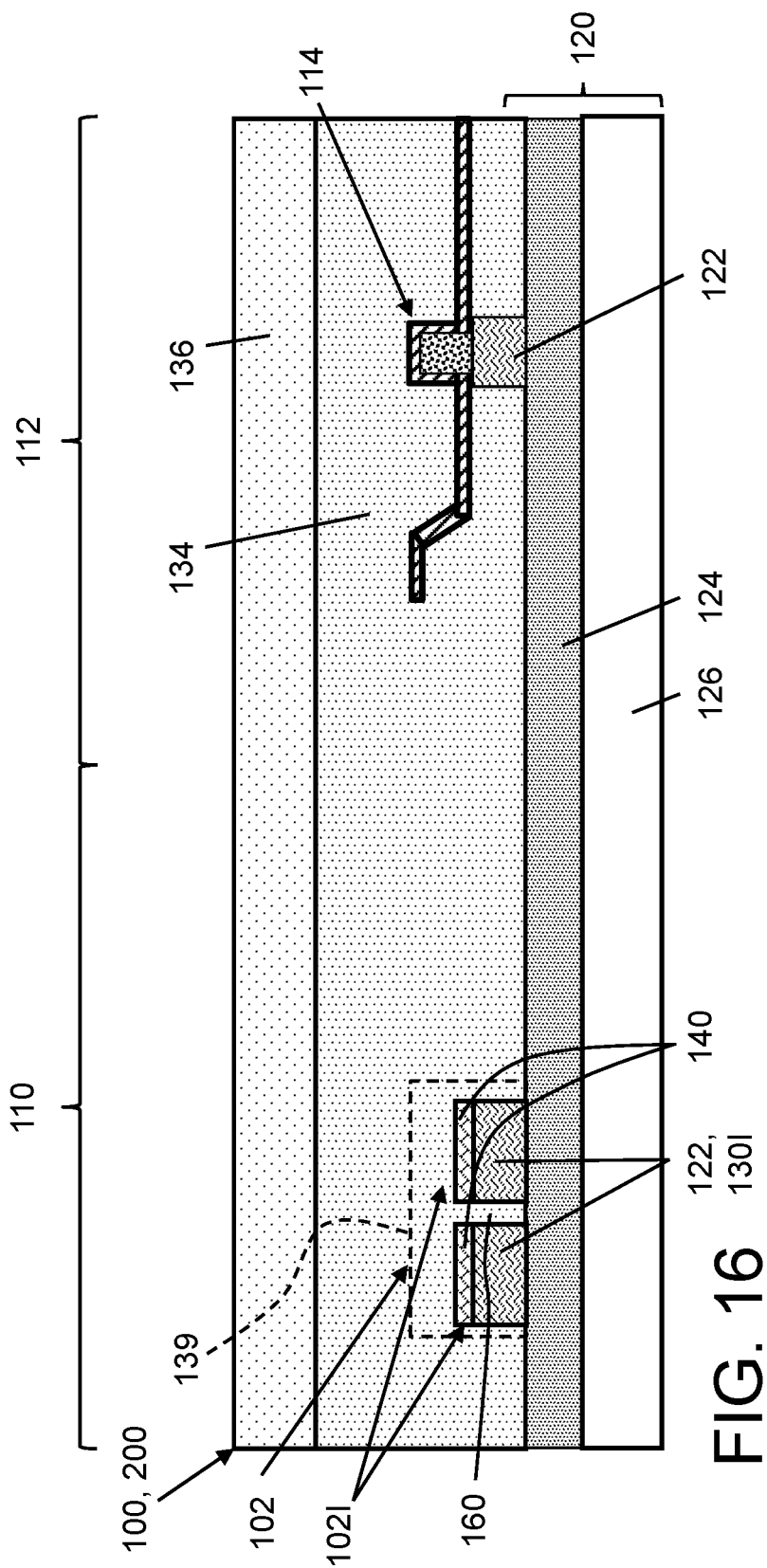
FIG. 16 shows a cross-sectional view of a structure including a plurality of laterally adjacent hybrid plasmonic waveguides having silicon waveguide cores, according to embodiments of the disclosure.
Figure 17:
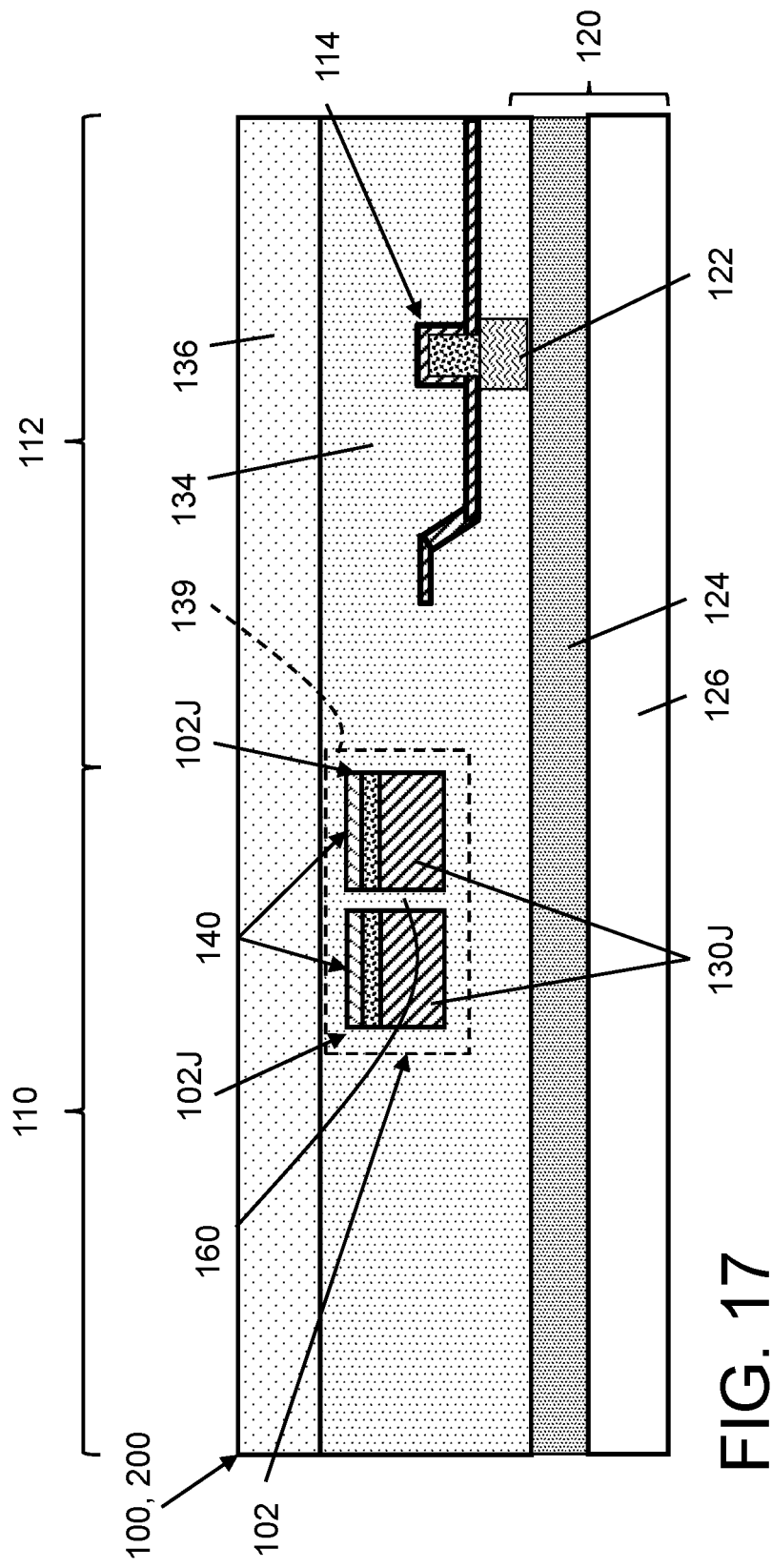
FIG. 17 shows a cross-sectional view of a structure including a plurality of laterally adjacent hybrid plasmonic waveguides having silicon nitride waveguide cores, according to embodiments of the disclosure.

While FIG. 15 shows two sets of HP waveguide portions 102I, 102J, as shown in FIGS. 16 and 17, it is possible to use only one set such that structure 100 and HP waveguide 102 may include adjacent HP waveguide portions 102I (FIG. 16) or adjacent HP waveguide portions 102J (FIG. 17). That is, structure 100 and HP waveguide 102 may include a plurality of HP waveguide portions 102I or 102J with each of the plurality of HP waveguide portions 102I or 102J laterally spaced from an adjacent HP waveguide portion 102I or 102J by a dielectric spacer 160. Each set of HP waveguide portions 102I, 102J may be operatively coupled to a different optical component 139, or the same optical component 139.

Figure 18:
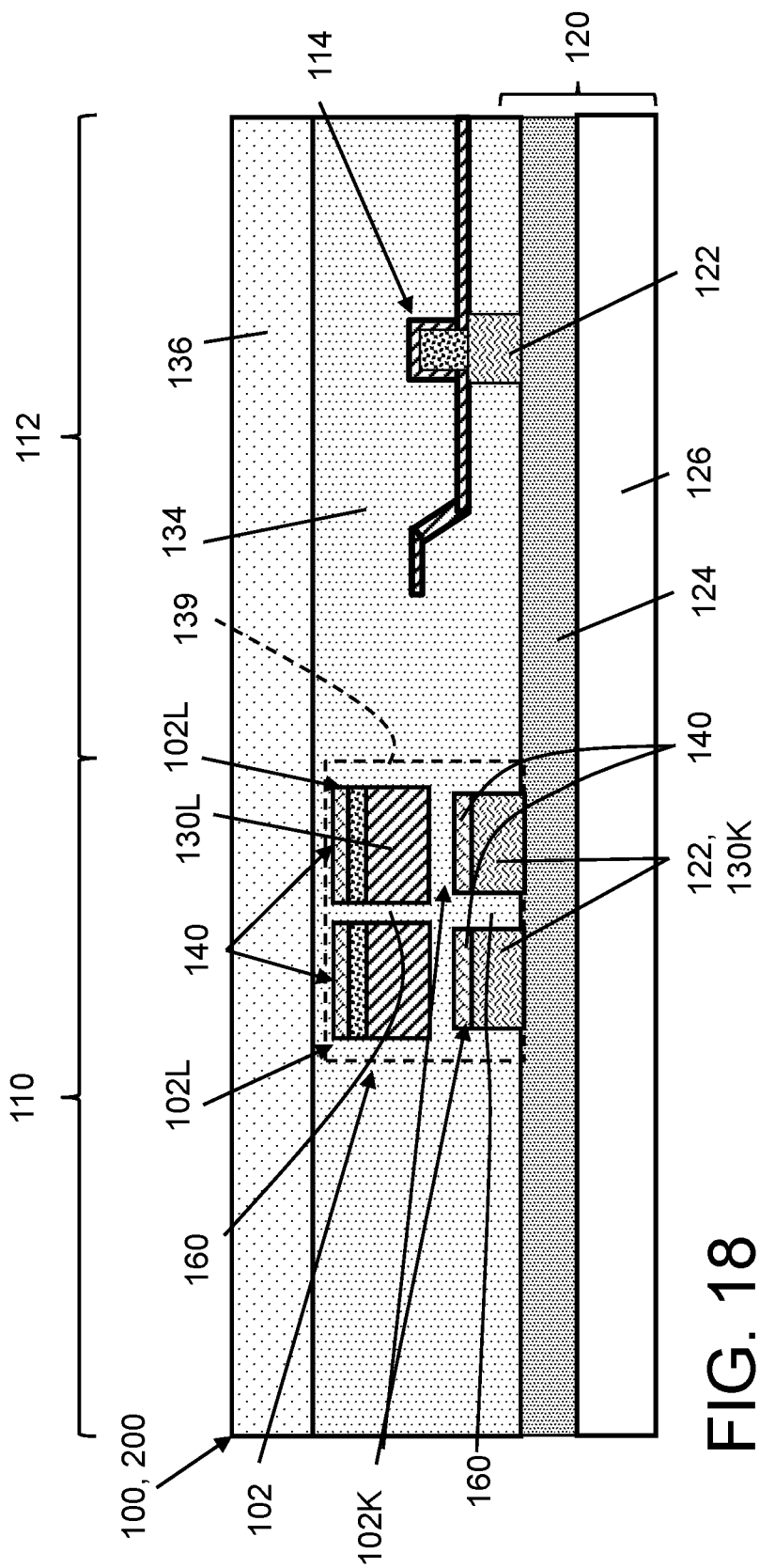
FIG. 18 shows a cross-sectional view of a structure including two pluralities of stacked and laterally adjacent hybrid plasmonic waveguides, according to embodiments of the disclosure.

FIG. 18 shows structure 100 and HP waveguide 102 where the structure of FIG. 14 is laterally repeated. That is, structure 100 includes a plurality of first HP waveguide portions 102K that are laterally adjacent one another under a plurality of second HP waveguide portions 102L that are laterally adjacent one another. In the example shown, first HP waveguide portions 102K are in a lower dielectric layer of structure 100 than second waveguide portions 102L, e.g., via layer (VO) over the active layer (SOI layer 122) of CMOS device 114 versus first metal layer (ILD 134). In these embodiments, waveguide cores 130K, 130L of first and second hybrid plasmonic waveguide portions 102K, 102L include different materials. For example, HP waveguide portions 102K include silicon waveguide cores 130K and HP waveguide portions 102L include silicon nitride waveguide cores 130L. Each of the plurality of hybrid plasmonic waveguide portions 102K or 102L are laterally spaced from an adjacent hybrid plasmonic waveguide by a dielectric spacer 160, e.g., of ILD 134. Each set of HP waveguide portions 102K, 102L may be operatively coupled to a different optical component 139, or the same optical component 139.

Figure 19:
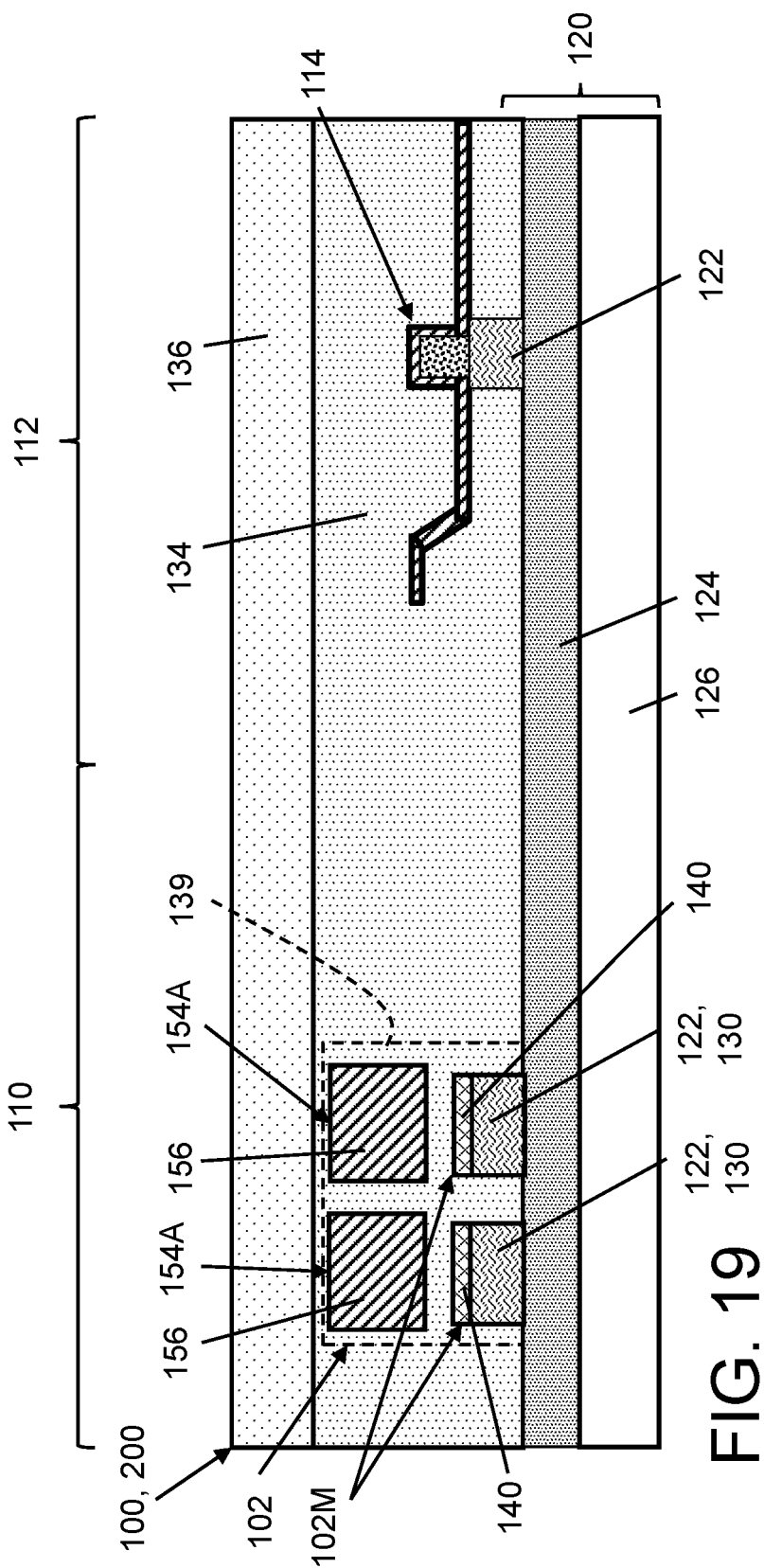
FIG. 19 shows a cross-sectional view of a structure including a plurality of laterally adjacent hybrid plasmonic waveguides stacked with a plurality of laterally adjacent dielectric waveguides, according to embodiments of the disclosure.

FIG. 19 shows structure 100 and HP waveguide 102 where the structure of FIG. 13 is laterally repeated. That is, structure 100 and HP waveguide 102 include a plurality of HP waveguide portions 102M laterally adjacent one another under a plurality of dielectric waveguides 154A laterally adjacent one another. Each dielectric waveguide 154A includes a waveguide core 156 including a dielectric. Dielectric waveguides 154 are devoid of the metal silicide layer contacting waveguide core 154 thereof. Dielectric waveguides 154A are operatively coupled to hybrid plasmonic waveguide portions 102M. More particularly, in these embodiments, dielectric waveguides 154 are adiabatically operatively coupled to HP waveguide portions 102M thereunder, i.e., they are not physically connected but there is dielectric, such as ILD 134, therebetween through which an optical signal may communicate between the waveguides. In the example shown, dielectric waveguides 154A include silicon nitride waveguide cores 156, and HP waveguide portions 102M includes silicon waveguide cores 130 (with metal silicide layers 140 thereon). Metal silicide layers 140 are between waveguide cores 130, 156. Each set of waveguides 154A, 102M may be operatively coupled to a different optical component 139, or the same optical component 139.

With further regard to the FIGS. 12-19 embodiments, while the pluralities or sets of waveguides described have been shown to include two waveguides each, any number of waveguides greater than two may also be used within the scope of the disclosure.

FIGS. 20-25 show schematic top-down views of HP waveguides 102, perhaps with dielectric waveguides 154 included therein, according to other embodiments of the disclosure. Note again, in FIGS. 20-25, the waveguides with silicon nitride waveguide cores are shown in ILD layer(s) 134, 136 to illustrate they are in a different dielectric layer above those for the waveguides with silicon waveguide cores. In FIGS. 20-25, the waveguides are laterally adjacent one another.

Figure 20:
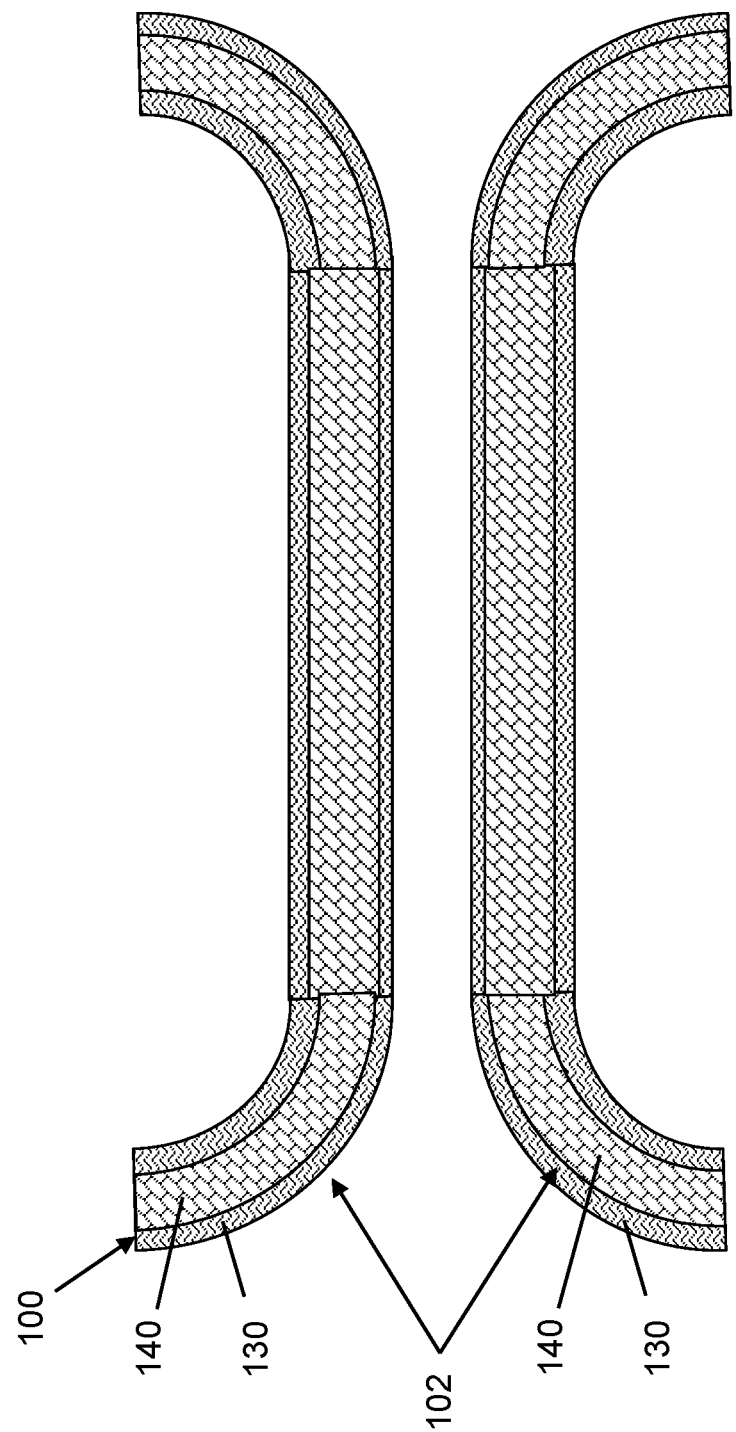
FIG. 20 shows a schematic top-down view of a structure including adiabatically operatively coupled hybrid plasmonic waveguides having silicon waveguide cores, according to embodiments of the disclosure.
Figure 21:
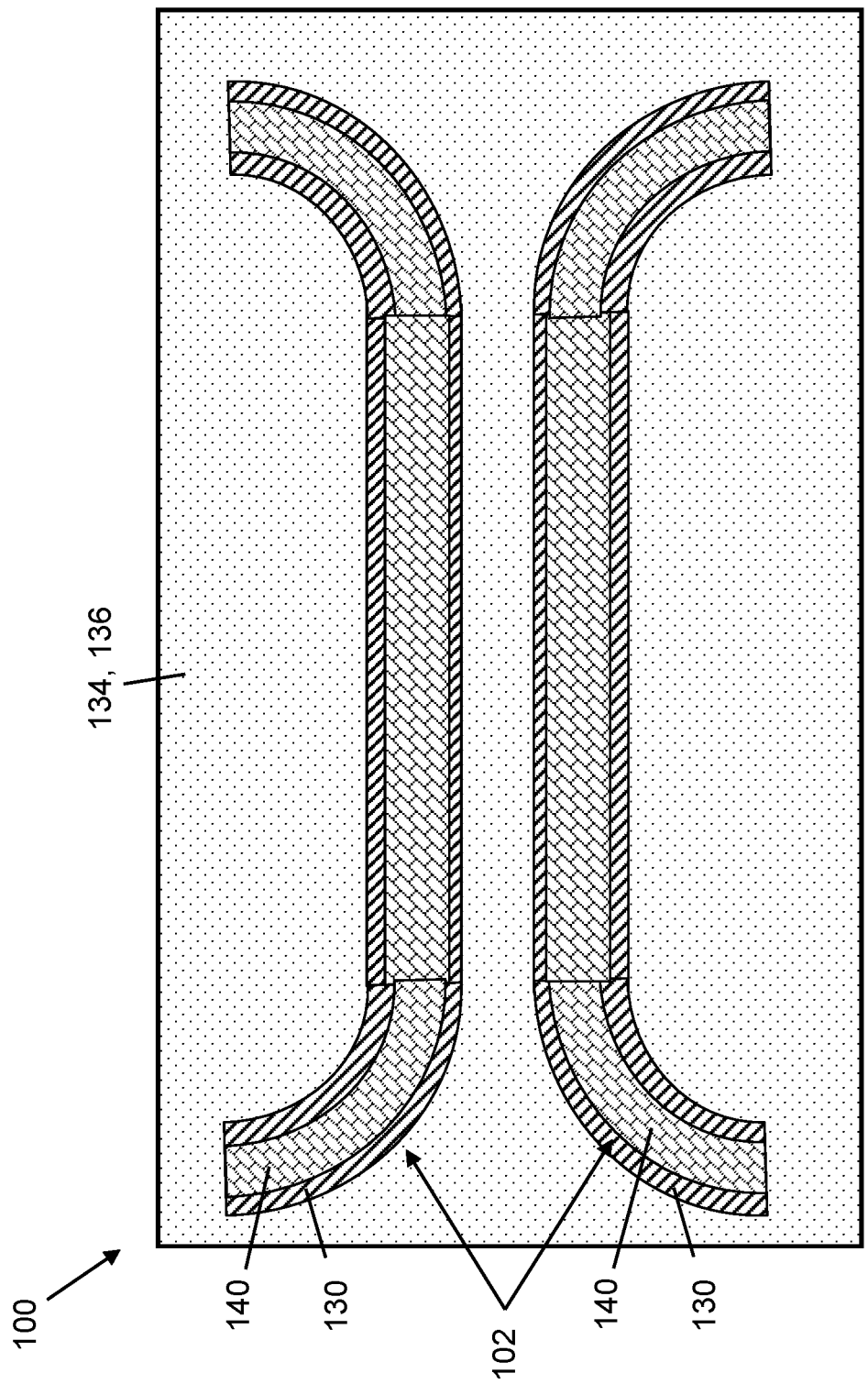
FIG. 21 shows a schematic top-down view of a structure including adiabatically operatively coupled hybrid plasmonic waveguides having silicon nitride waveguide cores, according to embodiments of the disclosure.
Figure 22:
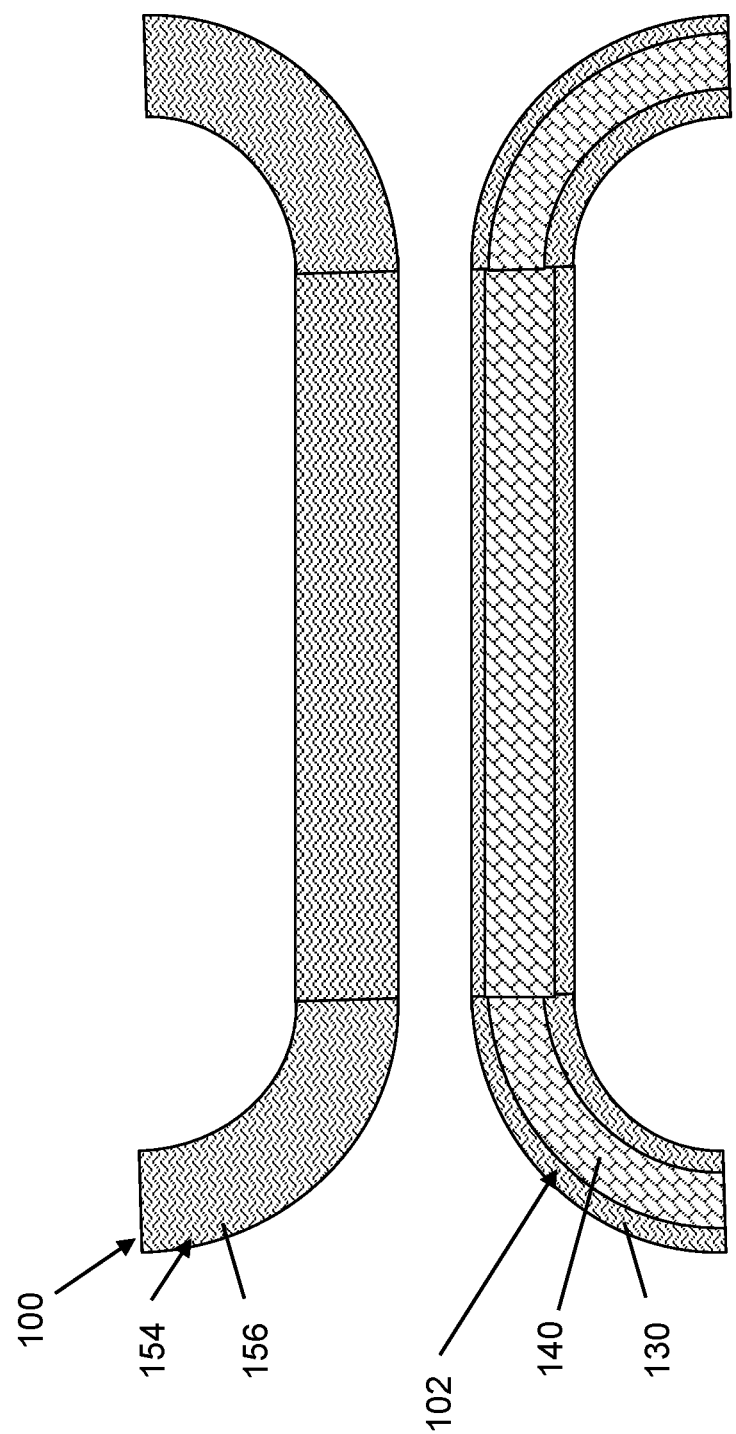
FIG. 22 shows a schematic top-down view of a structure including adiabatically operatively coupled hybrid plasmonic and dielectric waveguides, according to embodiments of the disclosure.
Figure 23:
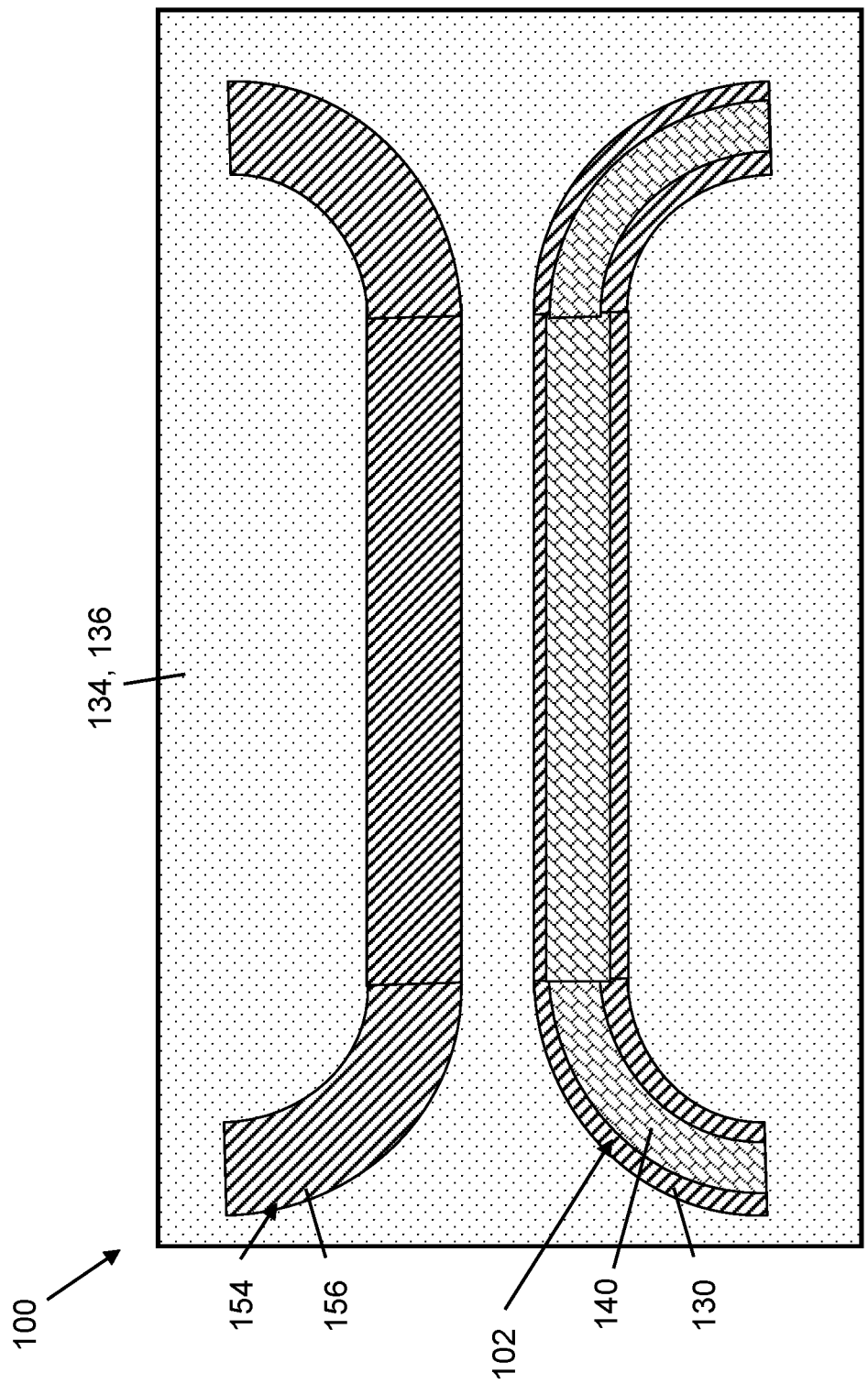
FIG. 23 shows a schematic top-down view of a structure including adiabatically operatively coupled hybrid plasmonic and dielectric waveguides, according to embodiments of the disclosure.
Figure 24:
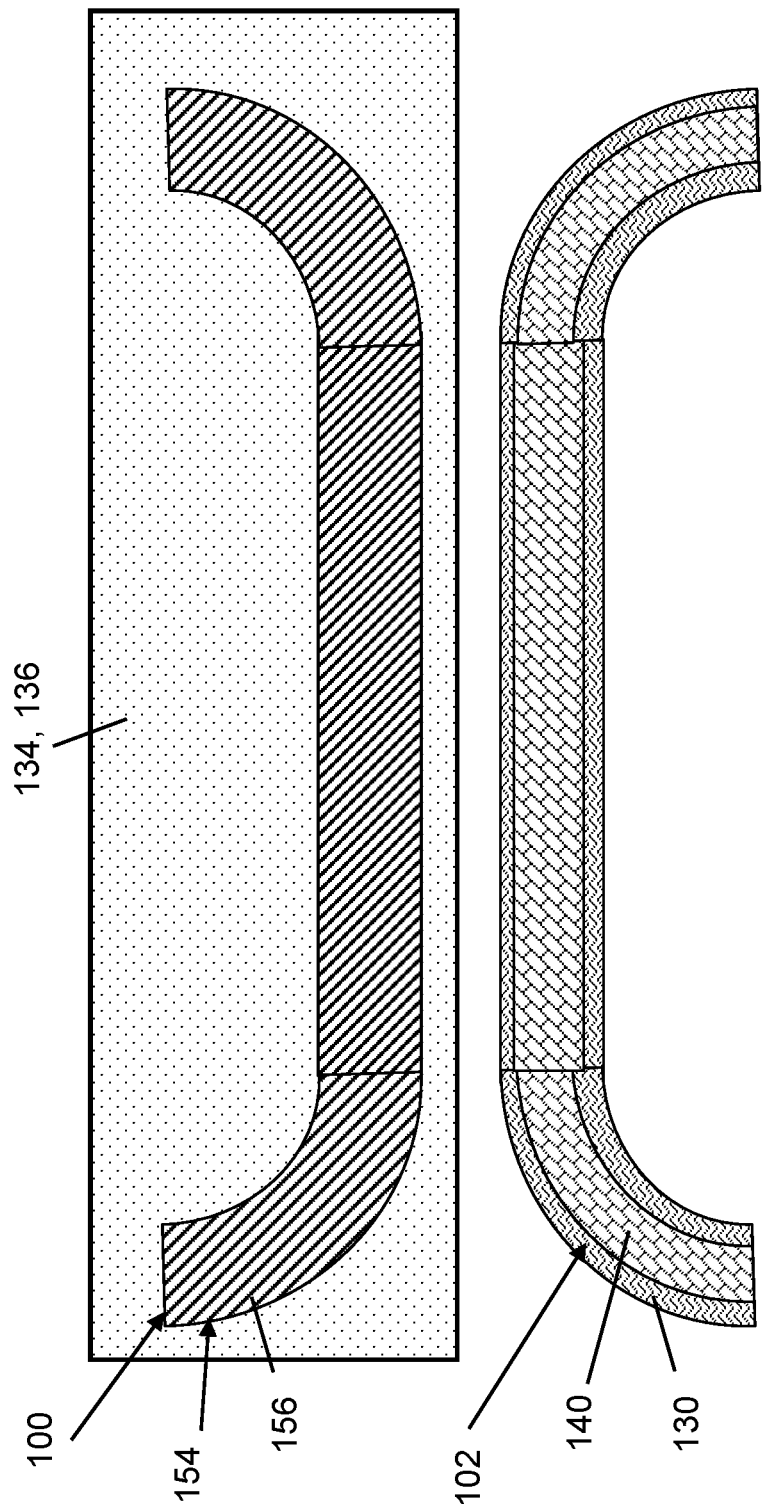
FIG. 24 shows a schematic top-down view of a structure including adiabatically operatively coupled hybrid plasmonic and dielectric waveguides, according to embodiments of the disclosure.
Figure 25:
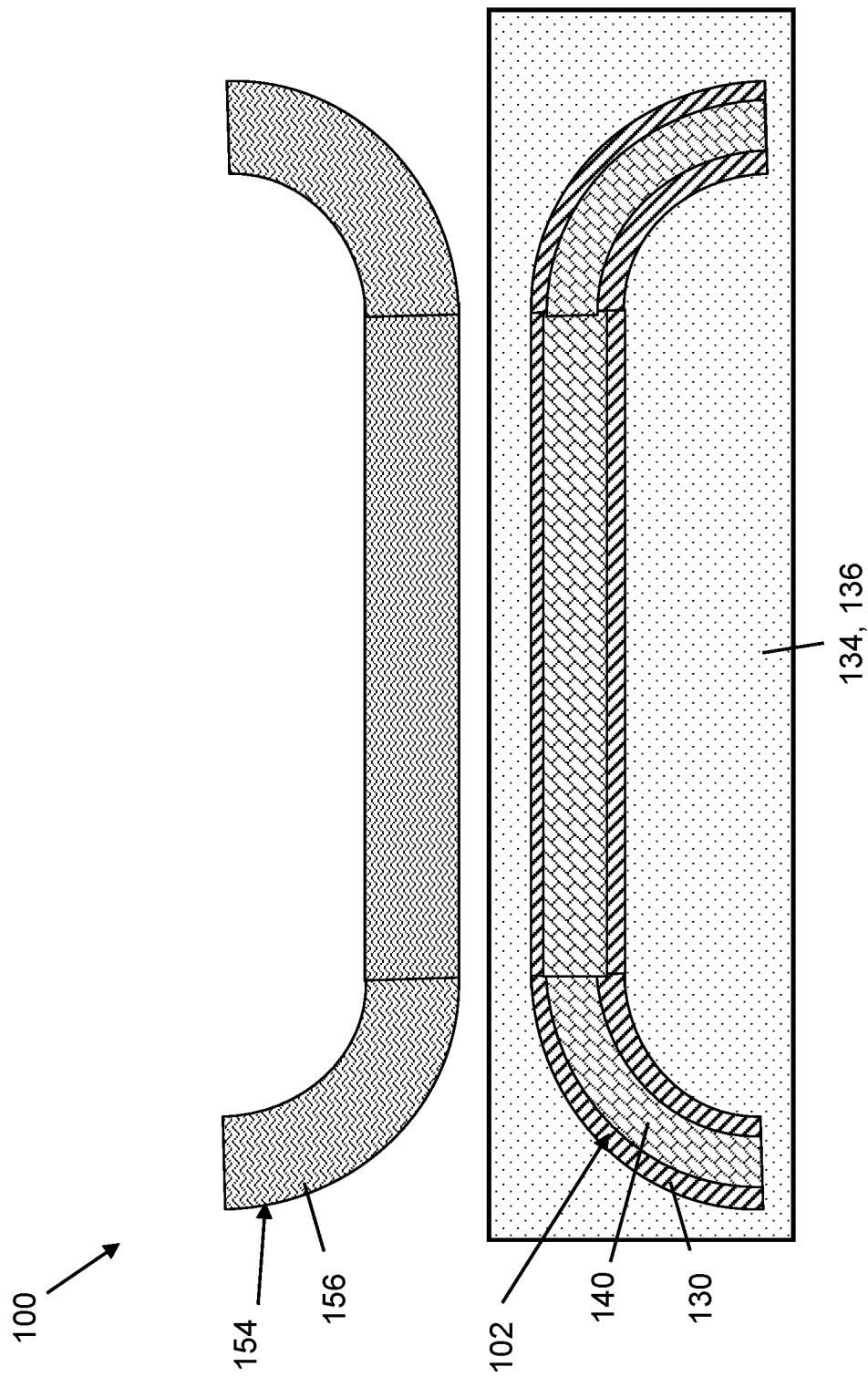
FIG. 25 shows a schematic top-down view of a structure including adiabatically operatively coupled hybrid plasmonic and dielectric waveguides, according to embodiments of the disclosure.

FIG. 20 shows two HP waveguides 102 with silicon waveguide cores 130 that are adiabatically operatively coupled. FIG. 21 shows two HP waveguides 102 with silicon nitride waveguide cores 130 that are adiabatically operatively coupled. FIG. 22 shows one HP waveguide 102 with a silicon waveguide core 130 adiabatically operatively coupled to a dielectric waveguide 154 with a silicon waveguide core 156. FIG. 23 shows one HP waveguide 102 with a silicon nitride waveguide core 130 adiabatically operatively coupled to a dielectric waveguide 154 with a silicon nitride waveguide core 156. FIG. 24 shows one HP waveguide 102 with a silicon waveguide core 130 adiabatically operatively coupled to a dielectric waveguide 154 with a silicon nitride waveguide core 156. FIG. 25 shows one HP waveguide 102 with a silicon nitride waveguide core 130 adiabatically operatively coupled to a dielectric waveguide 154 with a silicon waveguide core 156.

Referring to FIGS. 1, 2 and 11-19, a photonic integrated circuit (PIC) structure 200 according to embodiments of the disclosure is also shown. PIC structure 200 includes HP waveguide 102 including waveguide core 130 and metal silicide layer 140 contacting waveguide core 130. PIC structure 200 also includes CMOS device 114 integrated adjacent HP waveguide 102, e.g., in CMOS region 112. PIC structure 200 also includes an optical component 139 operatively coupled to HP waveguide 102 and configured to communicate an optical signal into or from at least HP waveguide 102. Optical component 139 is shown schematically with a dashed box; it can take a wide variety of forms such as but not limited to: an edge coupler, a light source, a laser, a grating coupler, or a photodiode. As understood in the art, optical component 139 is optically coupled to waveguide(s) 102, 154 for communicating an optical signal into or from the respective waveguides. Optical component 139 can be coupled to one or numerous waveguides.

A method according to embodiments of the disclosure may include forming a waveguide core 130 in a dielectric layer, such as ILD layers 134, 136 for HP waveguide 102. Waveguide core 130 can be formed in any manner described herein. Waveguide core 130 may include one of: crystalline silicon (c-Si), amorphous silicon (a-Si), polysilicon (polySi), polysilicon germanium (polySiGe), silicon nitride (SiN), silicon oxynitride (SiON), gallium nitride (GaN), and aluminum nitride (AlN). The method may also include forming metal silicide layer 140 contacting waveguide core 130. Metal silicide layer 140 can be formed in any manner described herein. Metal silicide layer 140 may include a non-noble metal such as nickel, titanium, or cobalt.

Embodiments of the disclosure provide various technical and commercial advantages, examples of which are discussed herein. HP waveguide 102 reduces the form factor for functional photonic components, so more waveguides can be positioned closer together on a given PIC structure. HP waveguide 102 also provides improved optical signal containment characteristics, e.g., refractive indices of at least 1.9 compared to that for gold (0.4) or silver (0.1). The metal silicide layer is also compatible with CMOS fabrication techniques, and capable of additional scaling with other CMOS structures. The HP waveguide also provides higher efficiency with less loss of the optical signal transmission. Use of HP waveguide 102 can also improve performance of other devices, e.g., it can increase extinction ratio/bandwidth for modulators.

The method and structures as described above are used in the fabrication of PIC chips. The resulting PIC chips can be distributed by the fabricator in raw wafer form (that is, as a single wafer that has multiple unpackaged chips), as a bare die, or in a packaged form. In the latter case the chip is mounted in a single chip package (such as a plastic carrier, with leads that are affixed to a motherboard or other higher-level carrier) or in a multichip package (such as a ceramic carrier that has either or both surface interconnections or buried interconnections). In any case the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. "Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about", "approximately" and "substantially", are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise. "Approximately" as applied to a particular value of a range applies to both values, and unless otherwise dependent on the precision of the instrument measuring the value, may indicate +/−10% of the stated value(s).

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

What is claimed is:

1. A structure comprising:
 a hybrid plasmonic waveguide including:
  a first waveguide core; and
  a metal silicide layer contacting the first waveguide core; and
 a dielectric waveguide including a second waveguide core including a dielectric, a dielectric waveguide part of the hybrid plasmonic waveguide, wherein the dielectric waveguide is devoid of the metal silicide layer contacting the second waveguide core thereof and the dielectric waveguide is adiabatically operatively coupled to the first waveguide core of the hybrid plasmonic waveguide.

2. The structure of claim 1, wherein the first waveguide core includes silicon and the metal silicide layer includes one of nickel silicide, titanium silicide and cobalt silicide.

3. The structure of claim 1, wherein the first waveguide core includes silicon nitride and the metal silicide layer includes one of: a nickel silicide layer on a nickel polysilicide layer, titanium silicide layer on titanium polysilicide layer, and a cobalt silicide layer on a cobalt polysilicide layer.

4. The structure of claim 1, wherein the first waveguide core includes one of crystalline silicon (c-Si), amorphous silicon (a-Si), polysilicon (polySi), polysilicon germanium (polySiGe), silicon nitride (SiN), silicon oxynitride (SiON), gallium nitride (GaN), and aluminum nitride (AlN); and
wherein the metal silicide layer includes one of nickel, titanium and cobalt.

5. The structure of claim 1, wherein the metal silicide layer co-extends along a length of the first waveguide core.

6. The structure of claim 1, wherein the hybrid plasmonic waveguide includes a plurality of hybrid plasmonic waveguide portions, each of the plurality of hybrid plasmonic waveguide portions laterally spaced from an adjacent hybrid plasmonic waveguide portion by a dielectric spacer.

7. The structure of claim 1, wherein the hybrid plasmonic waveguide includes a first hybrid plasmonic waveguide portion over a second hybrid plasmonic waveguide portion, wherein first waveguide cores of the first and second hybrid plasmonic waveguide portions include different materials.

8. The structure of claim 7, wherein the first hybrid plasmonic waveguide portion includes a plurality of first hybrid plasmonic waveguide portions laterally adjacent one another, and the second hybrid plasmonic waveguide portion includes a plurality of second hybrid plasmonic waveguide portions laterally adjacent one another.

9. The structure of claim 1, wherein the second waveguide core of the dielectric waveguide is directly operatively coupled to the first waveguide core of the hybrid plasmonic waveguide.

10. The structure of claim 1, further comprising a complementary metal-oxide semiconductor (CMOS) device integrated adjacent the hybrid plasmonic waveguide.

11. The structure of claim 1, further comprising an optical component operatively coupled to the hybrid plasmonic waveguide and configured to communicate an optical signal into or from the hybrid plasmonic waveguide.

12. A photonic integrated circuit (PIC) structure, comprising:
a hybrid plasmonic waveguide including a first waveguide core and a metal silicide layer contacting the first waveguide core;
a complementary metal-oxide semiconductor (CMOS) device integrated adjacent the hybrid plasmonic waveguide; and
an optical component operatively coupled to the hybrid plasmonic waveguide and configured to communicate an optical signal into or from the hybrid plasmonic waveguide,
wherein the first waveguide core includes silicon nitride and the metal silicide layer includes one of: a nickel silicide layer on a nickel polysilicide layer, titanium silicide layer on titanium polysilicide layer, and a cobalt silicide layer on a cobalt polysilicide layer.

13. The structure of claim 12, wherein the hybrid plasmonic waveguide includes a first hybrid plasmonic waveguide portion over a second hybrid plasmonic waveguide portion, wherein the first waveguide cores of the first and second hybrid plasmonic waveguide portions include different materials.

14. The structure of claim 13, wherein the first hybrid plasmonic waveguide portion includes a plurality of first hybrid plasmonic waveguide portions laterally adjacent one another, and the second hybrid plasmonic waveguide portion includes a plurality of second hybrid plasmonic waveguide portions laterally adjacent one another.

15. The structure of claim 12, further comprising a dielectric waveguide including a second waveguide core including a dielectric, the dielectric waveguide part of the hybrid plasmonic waveguide, wherein the dielectric waveguide is devoid of the metal silicide layer contacting the second waveguide core thereof.

16. A structure comprising:
a hybrid plasmonic waveguide including:
a first waveguide core;
a metal silicide layer contacting the first waveguide core; and
a first hybrid plasmonic waveguide portion over a second hybrid plasmonic waveguide portion, wherein first waveguide cores of the first and second hybrid plasmonic waveguide portions include different materials.

17. The structure of claim 16, wherein the metal silicide layer is over the first waveguide core.

18. The structure of claim 16, wherein the metal silicide layer is under the first waveguide core.

19. The structure of claim 16, wherein the first hybrid plasmonic waveguide portion includes a plurality of first hybrid plasmonic waveguide portions laterally adjacent one another, and the second hybrid plasmonic waveguide portion includes a plurality of second hybrid plasmonic waveguide portions laterally adjacent one another.

20. The structure of claim 16, further comprising a complementary metal-oxide semiconductor (CMOS) device integrated adjacent the hybrid plasmonic waveguide.

* * * * *